(12) United States Patent
Yamahiro et al.

(10) Patent No.: US 7,687,593 B2
(45) Date of Patent: Mar. 30, 2010

(54) FLUORINATED POLYMER AND POLYMER COMPOSITION

(75) Inventors: Mikio Yamahiro, Chiba (JP); Koji Ohguma, Chiba (JP); Hisao Oikawa, Chiba (JP); Hisanobu Minamizawa, Chiba (JP); Hiroyuki Sato, Chiba (JP); Kenichi Watanabe, Tokyo (JP)

(73) Assignee: Chisso Corporation, Osaka (JP)

( * ) Notice: Subject to any disclaimer, the term of this patent is extended or adjusted under 35 U.S.C. 154(b) by 669 days.

(21) Appl. No.: 11/528,692

(22) Filed: Sep. 28, 2006

(65) Prior Publication Data

US 2007/0135602 A1 Jun. 14, 2007

(30) Foreign Application Priority Data

| Sep. 28, 2005 | (JP) | ............................. 2005-282232 |
| Feb. 20, 2006 | (JP) | ............................. 2006-042561 |
| Jul. 24, 2006 | (JP) | ............................. 2006-201319 |
| Sep. 28, 2006 | (JP) | ............................. 2006-264776 |

(51) Int. Cl.
   *C08G 77/12* (2006.01)
(52) U.S. Cl. .............................. 528/31; 528/42; 528/279
(58) Field of Classification Search .................... 528/31
   See application file for complete search history.

(56) References Cited

U.S. PATENT DOCUMENTS

| 4,673,621 | A | 6/1987 | Fujiki et al. |
| 5,166,244 | A | 11/1992 | Fukushima et al. |
| 5,484,867 | A | 1/1996 | Lichtenhan et al. |
| 6,916,543 | B2 * | 7/2005 | De et al. ..................... 428/447 |
| 2004/0030084 | A1 | 2/2004 | Morimoto et al. |
| 2004/0198855 | A1 * | 10/2004 | Adegawa ..................... 521/154 |
| 2005/0038135 | A1 * | 2/2005 | Jin et al. ...................... 523/115 |
| 2005/0215807 | A1 | 9/2005 | Morimoto et al. |

FOREIGN PATENT DOCUMENTS

| JP | 61-228078 | 10/1986 |
| JP | 2-281063 | 11/1990 |
| JP | 3-200885 | 9/1991 |
| JP | 5-139997 | 6/1993 |
| JP | 7-8554 | 2/1995 |
| JP | 7-52326 | 2/1995 |
| JP | 7-68424 | 7/1995 |
| JP | 8-109263 | 4/1996 |
| JP | 9-59125 | 3/1997 |
| JP | 10-1537 | 1/1998 |
| JP | 2004-123698 | 4/2004 |
| JP | 2005-105265 | 4/2005 |
| JP | 2005-272506 | 10/2005 |

OTHER PUBLICATIONS

M. Kamachi et al., *Handbook of Radical Polymerization*, New Technology New Science, Aug. 1999.
K. Matyjaszewski et al., *Handbook of Radical Polymerization*, A. John Wiley and Sons, Inc., 2002.
*Photosensitive Materials List Book*, The Technical Association of Photopolymers, Japan, Mar. 1996.

* cited by examiner

*Primary Examiner*—Randy Gulakowski
*Assistant Examiner*—Lindsay Nelson
(74) *Attorney, Agent, or Firm*—Hogan & Hartson LLP

(57) ABSTRACT

Provided are: an addition polymer of fluorosilsesquioxane (a) having one addition polymerizable functional group or an addition copolymer of the fluorosilsesquioxane (a) having one addition polymerizable functional group and an addition polymerizable monomer (b); a coating film including the polymer or the copolymer; and an addition copolymer of the fluorosilsesquioxane (a) having one addition polymerizable functional group and organopolysiloxane (c) having an addition polymerizable functional group, or an addition copolymer of the fluorosilsesquioxane (a) having one addition polymerizable functional group, the organopolysiloxane (c) having an addition polymerizable functional group, and the addition polymerizable monomer (b).

26 Claims, 2 Drawing Sheets

FLUORINATED POLYMER AND POLYMER COMPOSITION

TECHNICAL FIELD

The invention relates to a polymer containing fluorine. Specifically, the invention relates to: a fluorine-contained polymer in which at least a part of structural units is a structural unit containing a fluorosilsesquioxane structure; a fluorine-contained polymer composition containing the fluorine-contained polymer; and a surface treating agent containing the fluorine-contained polymer composition.

Further, the invention relates to a cured coating film which is a coating obtainable by using the surface treating agent containing the fluorine-contained polymer composition and which has non-wetting properties, antifouling-properties, nonstick, releasability, sliding properties, abrasion resistance, corrosion resistance, electrical insulating properties, antireflection properties, fire retardancy, antistatic properties, chemical resistance, and weather resistance.

BACKGROUND ART

Silsesquioxane is a polysiloxane which has a specific structure, and is an interesting compound. Use of the silsesquioxane provides excellent heat resistance and weather resistance, so the silsesquioxane is expected to be used, for example, as a modifying agent for thermoplastic resins, an interlayer insulating film, a sealing material, a fire retardant, or a coating additive.

In view of the above circumstances, there has been an attempt to introduce various kinds of functional groups into silsesquioxane, and there has been a report on the silsesquioxane into which a group containing fluorine is introduced (see, for example, JP 2004-123698 A).

There has also been a report on a polymer having silsesquioxane (see, for example, U.S. Pat. No. 5,484,867 A). The polymer having silsesquioxane is reported to provide a polymer composition having preferably controlled thermal properties and mechanical properties which are obtained by being blended with an organic or inorganic polymer. Further, there has been a report that a polymer having silsesquioxane may have mesomorphism in some cases. Still further, there has been a report on a fluorine-containing silsesquioxane polymer and a production method thereof (see, for example, JP 2005-272506 A). The fluorine-containing silsesquioxane polymer is reported to be preferably used as a non-wetting, an antifouling treating agent and a fire retardant for fiber, a sealing material for semiconductors, or an insulating film for semiconductors.

In recent years, a silicone resin-based adhesive mainly composed of polydimethylsiloxane has been widely used as an adhesive in various applications because the silicone resin-based adhesive has excellent heat resistance, cold resistance, water resistance, weather resistance, readhesion property, and electrical insulating properties, and further has excellent adhesiveness to a polyimide, a polyamide, polytetrafluoroethylene, a silicone rubber, and the like to which general organic adhesives are hard to stick. Further, the silicone resin-based adhesive has no skin irritation which an acrylic adhesive has and has no toxicity, and therefore is used as an adhesive tape for medical use such as a bandage in recent years. For example, there has been disclosed an application for a pressure-sensitive adhesive tape such as a first aid adhesive tape (JP 07-052326 A, JP 07-008554 B, and JP 03-200885 A).

However, those silicone resin-based adhesives each have a small surface tension and extremely strong adhesiveness, so they may exert insufficient releasability when a releasing agent composed of conventional curable silicone resin is used. In particular, when released paper is stuck on an adhesive side of an adhesive tape or adhesive label, which uses an adhesive mainly composed of polydimethylsiloxane, and the adhesive tape (or label) is kept for a long period of time before use, it may be no use in some cases. The reason is as follows: when one attempts to roll out a tape from a round adhesive tape while peeling off an adhesive layer of a part of the tape which rolls out from the back face of a lower tape, or, when one attempts to peel off released paper from the adhesive side, a significant increase in peel force is caused and destruction between the adhesive layers occurs in some cases.

Accordingly, there are disclosed releasing agents to be used as separators for silicone resin-based adhesives such as a copolymer of a (polyfluoro)alkylvinyl monomer and a silane monomer having an ethylenic unsaturated bond and a silicone functional group in the molecule (JP 61-228078 A), and a composition which contains copolymers: a copolymer of fluorinated vinylidene and/or tetrafluoroethylene and another fluorine-containing monomer having an ethylenic unsaturated bond; and the copolymer used in JP 61-228078 A (JP 02-281063 A).

However, any one of the copolymers disclosed in JP 61-228078 A and JP 02-281063 A is expensive in itself. Moreover, any one of those copolymers can not dissolve in a general organic solvent such as hydrocarbon, so they are required to be dissolved in a Freon-based solvent for application. The Freon-based solvent vaporizes to cause destruction of ozone layer, and therefore the use of those copolymers is not preferable. In view of the foregoing, use of a releasing agent which can dissolve in a general organic solvent is desired. Further, the copolymer disclosed in JP 61-228078 A has problems that the copolymer has insufficient adhesiveness and coating film strength against a substrate such as a plastic film and that a release material layer itself may easily be peeled depending on conditions of use.

The inventors of the invention have conducted searches for various kinds of releasing components in view of the foregoing. As a result, the inventors of the invention have found that a fluorine-contained polymer having as essential components fluorosilsesquioxane and organopolysiloxane is excellent in releasability against a silicone resin-based adhesive. In addition, it is found to be important to improve the adhesiveness of the fluorine-contained polymer to a substrate without decreasing releasability of the releasing component in order to form a coating on the surface of a substrate such as a plastic film, glass, and a metal and to express releasing performance by using the fluorine-contained polymer. Various formulations have been examined for fixing the releasing component on the substrate. As a result, the inventors of the invention found that a conjugate, which is a conjugate of a fluorine-contained polymer containing a polymerizable monomer having a crosslinking functional group in addition to fluorosilsesquioxane and organopolysiloxane and a matrix resin having a crosslinking functional group, can be adhesive to the surface of the substrate and exert favorable releasability against general adhesives such as an acrylic adhesive, a resin for release molding, and a silicone resin. Consequently, the inventors of the invention have attained a fluorine-contained polymer composition and a surface treating agent containing the fluorine-contained polymer composition for producing a cured coating film. The cured coating film obtainable by using the surface treating agent has favorable releasability and favorable properties such as non-wetting properties, sliding properties, antifouling-properties, electrical insulating properties, transparency, chemical resistance, and heat resistance.

DISCLOSURE OF THE INVENTION

An object of the invention is to provide a polymer containing silsesquioxane having fluorine. Another object of the invention is to find novel applications of the polymer containing silsesquioxane. Examples of the novel applications include use of the polymer containing silsesquioxane having fluorine as a surface modifying agent, and preferably as a surface modifying agent for a matrix resin. The applications preferably include the case where a cured coating film composed of a release material layer formed on the surface of a substrate such as a plastic film do not use a Freon-based solvent which seriously affects the environment in a surface treating agent containing a fluorine-contained polymer composition, which is a raw material of the release material layer. The applications further include the case where the cured coating film has good adhesion to the substrate. The applications still further include the case where: the cured coating film exerts releasability by which peeling force hardly increases and is stable against an adhesive layer even when the cured coating film peels off the surface of the adhesive after the cured coating film is stuck on a pressure-sensitive adhesive tape which uses a silicone resin-based adhesive which is excellent in adhesiveness to adherends such as a polyimide, a polyamide, polytetrafluoroethylene, and a silicone rubber to which general organic adhesives are hard to stick, followed by heat treatment.

That is, the invention relates to polymers shown below.

(1) An addition polymer of fluorosilsesquioxane (a) having one addition polymerizable functional group or an addition copolymer of the fluorosilsesquioxane (a) having one addition polymerizable functional group and an addition polymerizable monomer (b).

(2) The polymer according to Item (1), in which the fluorosilsesquioxane (a) is represented by the following formula (I).

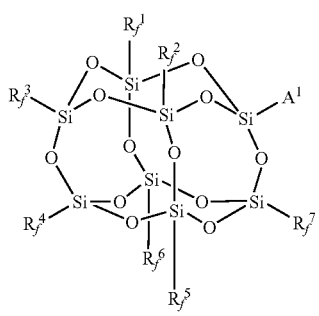
(I)

In the formula (I):

$R_f^1$ to $R_f^7$ each independently represent:

linear or branched fluoroalkyl having 1 to 20 carbon atoms and arbitrary methylene thereof may be substituted by oxygen;

fluoroaryl having 6 to 20 carbon atoms and at least one hydrogen which is substituted by fluorine or trifluoromethyl; or fluoroarylalkyl having 7 to 20 carbon atoms and at least one hydrogen of the aryl, which is substituted by fluorine or trifluoromethyl, and $A^1$ represents an addition polymerizable functional group.

(3) The polymer according to Item (2), in which $R_f^1$ to $R_f^7$ in the formula (I) each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy)propyl, pentafluorophenylpropyl, pentafluorophenyl, or α,α,α-trifluoromethylphenyl.

(4) The polymer according to Item (3), in which $R_f^1$ to $R_f^7$ in the formula (I) each independently represent 3,3,3-trifluoropropyl or 3,3,4,4,5,5,6,6,6-nonafluorohexyl.

(5) The polymer according to any one of Items (2) to (4), in which $A^1$ in the formula (I) represents a radical polymerizable functional group.

(6) The polymer according to any one of Items (2) to (5), in which $A^1$ in the formula (I) includes (meth)acrylic or styryl.

(7) The polymer according to Item (6), in which $A^1$ in the formula (I) is any one of groups represented by the following formulae (II) and (III).

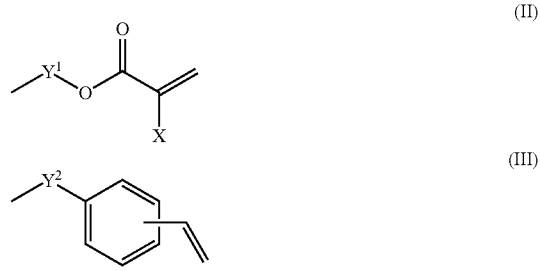

In the formula (II), $Y^1$ represents alkylene having 2 to 10 carbon atoms and X represents hydrogen or alkyl having 1 to 3 carbon atoms, and in the formula (III), $Y^2$ represents a single bond or alkylene having 1 to 10 carbon atoms.

(8) The polymer according to Item (7), in which:

in the formula (II), $Y^1$ represents alkylene having 2 to 6 carbon atoms and X represents hydrogen or alkyl having 1 to 3 carbon atoms; and in the formula (III), $Y^2$ represents a single bond or alkylene having 1 to 6 carbon atoms.

(9) The polymer according to Item (7), in which:

in the formula (II), $Y^1$ represents propylene and X represents hydrogen or methyl; and in the formula (III), $Y^2$ represents a single bond or ethylene.

(10) The polymer according to any one of Items (1) to (9), in which the addition polymerizable monomer (b) is a (meth) acrylic compound or a styrene compound.

(11) The polymer according to any one of Items (1) to (10), in which at least a part of the addition polymerizable monomer (b) is an addition polymerizable monomer having a crosslinking functional group.

The invention further relates to compositions shown below.

(12) A curable polymer composition, including the polymer according to Item (11) and an epoxy resin monomer.

The invention further relates to polymers shown below.

(13) An addition copolymer of fluorosilsesquioxane (a) having one addition polymerizable functional group and organopolysiloxane (c) having an addition polymerizable functional group, or an addition copolymer of the fluorosilsesquioxane (a) having one addition polymerizable functional group, the organopolysiloxane (c) having an addition polymerizable functional group, and an addition polymerizable monomer (b).

(14) The polymer according to Item (13), in which the fluorosilsesquioxane (a) is represented by the following formula (I).

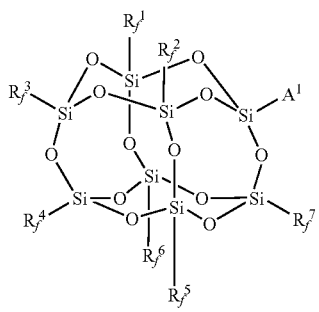

(In the formula (I):
$R_f^1$ to $R_f^7$ each independently represent:
linear or branched fluoroalkyl having 1 to 20 carbon atoms and arbitrary methylene thereof may be substituted by oxygen;
fluoroaryl having 6 to 20 carbon atoms and at least one hydrogen which is substituted by fluorine or trifluoromethyl; or
fluoroarylalkyl having 7 to 20 carbon atoms and at least one hydrogen of the aryl, which is substituted by fluorine or trifluoromethyl, and
$A^1$ represents an addition polymerizable functional group.)

(15) The polymer according to Item (14), in which $R_f^1$ to $R_f^7$ in the formula (I) each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrododecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

(16) The polymer according to Item (15), in which $R_f^1$ to $R_f^7$ in the formula (I) each independently represent 3,3,3-trifluoropropyl or 3,3,4,4,5,5,6,6,6-nonafluorohexyl.

(17) The polymer according to any one of Items (13) to (16), in which the organopolysiloxane (c) is represented by the following formula (IV).

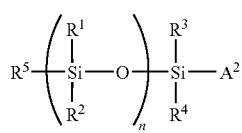

(In the formula (IV): n represents an integer of 1 to 1,000; $R^1$, $R^2$, $R^3$, $R^4$, and $R^5$ each represent a group independently selected from the group consisting of hydrogen; alkyl having 1 to 30 carbon atoms, arbitrary hydrogen thereof may be substituted by fluorine, and arbitrary —$CH_2$— thereof may be substituted by —O— or cycloalkylene; substituted or unsubstituted aryl; and arylalkyl composed of substituted or unsubstituted aryl and alkylene having arbitrary hydrogen thereof may be substituted by fluorine and arbitrary —$CH_2$— thereof may be substituted by —O— or cycloalkylene; and $A^2$ represents an addition polymerizable functional group.)

(18) The polymer according to Item (17), in which:
in the formula (IV), $R^1$ and $R^2$ each independently represent hydrogen, phenyl, or alkyl having 1 to 8 carbon atoms and arbitrary hydrogen thereof may be substituted by fluorine;
$R^3$ and $R^4$ each independently represent alkyl having 1 to 20 carbon atoms and arbitrary hydrogen thereof may be substituted by fluorine, aryl having 6 to 20 carbon atoms and arbitrary hydrogen thereof may be substituted by fluorine, or arylalkyl having 7 to 20 carbon atoms and arbitrary hydrogen thereof may be substituted by fluorine; and
$R^5$ represents alkyl having 1 to 20 carbon atoms and arbitrary hydrogen thereof may be substituted by fluorine, aryl having 6 to 20 carbon atoms and arbitrary hydrogen thereof may be substituted by fluorine, or arylalkyl having 7 to 20 carbon atoms and arbitrary hydrogen thereof may be substituted by fluorine.

(19) The polymer according to Item (18), in which:
in the formula (IV), $R^1$ and $R^2$ each independently represent methyl, phenyl, or 3,3,3-trifluoropropyl;
$R^3$ and $R^4$ each independently represent methyl or phenyl; and
$R^5$ represents methyl, ethyl, propyl, butyl, isobutyl, or phenyl.

(20) The polymer according to Item (19), in which $R^1$, $R^2$, $R^3$, and $R^4$ each simultaneously represent methyl.

(21) The polymer according to any one of Items (14) to (20), in which $A^1$ in the formula (I) and $A^2$ in the formula (IV) each represent an addition polymerizable functional group.

(22) The polymer according to Item (21), in which $A^1$ in the formula (I) and $A^2$ in the formula (IV) each represent a radical polymerizable functional group.

(23) The polymer according to Item (22), in which $A^1$ in the formula (I) and $A^2$ in the formula (IV) each include (meth)acrylic or styryl.

(24) The polymer according to Item (23), in which $A^1$ in the formula (I) is any one of groups represented by the following formulae (V) and (VII), and $A^2$ in the formula (IV) is any one of groups represented by the following formulae (V), (VI), and (VII).

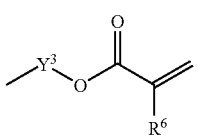

-continued

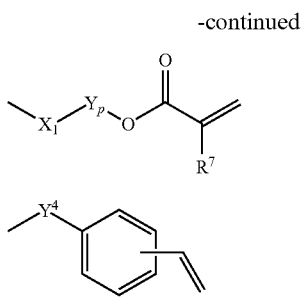

(In the formula (V), $Y^3$ represents alkylene having 2 to 10 carbon atoms, and $R^6$ represents hydrogen, linear or branched alkyl having 1 to 5 carbon atoms, or aryl having 6 to 10 carbon atoms, in the formula (VI), $R^7$ represents hydrogen, liner or branched alkyl having 1 to 5 carbon atoms, or aryl having 6 to 10 carbon atoms, $X_1$ represents alkylene having 2 to 20 carbon atoms, Y represents —OCH$_2$CH$_2$—, —OCH(CH$_3$)CH$_2$—, or —OCH$_2$CH(CH$_3$)—, and p represents an integer of 0 to 3, and, in the formula (VII), $Y^4$ represents a single bond or alkylene having 1 to 10 carbon atoms.

(25) The polymer according to Item (24), in which:
in the formula (V), $Y^3$ represents alkylene having 2 to 6 carbon atoms, and $R^6$ represents hydrogen or alkyl having 1 to 3 carbon atoms;
in the formula (VII), $X_1$ represents —CH$_2$CH$_2$CH$_2$—, Y represents —OCH$_2$CH$_2$—, p represents an integer of 0 or 1, and $R^7$ represents hydrogen or alkyl having 1 to 3 carbon atoms; and, in the formula (VII), $Y^4$ represents a single bond or alkylene having 1 or 2 carbon atoms.

(26) The polymer according to any one of Items (13) to (25), in which the addition polymerizable monomer (b) is at least one kind of an addition polymerizable monomer having a crosslinking functional group and a monomer having no crosslinking functional group.

(27) The polymer according to any one of Items (13) to (25), in which the addition polymerizable monomer (b) is an addition polymerizable monomer having a crosslinking functional group.

(28) The polymer according to Item (27), in which the addition polymerizable monomer having a crosslinking functional group is a compound which has a radical polymerizable functional group and in the same molecule at least one of hydroxy, glycidyl, oxetanyl, epoxycyclohexenyl, halogenated alkyl, blocked isocyanato, isocyanato, amino, and carboxyl.

(29) The polymer according to Item (28), in which the radical polymerizable functional group in the addition polymerizable monomer having a crosslinking functional group is (meth)acryl or styryl.

(30) A polymer composition, comprising the polymer according to any one of Items (13) to (29) and a thermoplastic resin and/or a thermosetting resin.

(31) A polymer composition, comprising the polymer according to any one of Items (13) to (29) and a thermosetting resin.

(32) The polymer composition according to Item (31), in which the thermosetting resin is a compound which has hydroxy, glycidyl, oxetanyl, epoxycyclohexenyl, halogenated alkyl, blocked isocyanato, isocyanato, amino, or carboxyl.

(33) The polymer composition according to Item (32), in which the thermosetting resin is a compound which has glycidyl, oxetanyl, or epoxycyclohexenyl.

(34) A surface treating agent, comprising the polymer or the polymer composition according to any one of Items (13) to (33).

(35) A coating film, which is obtainable by using the surface treating agent according to Item (34).

(36) A peel-off coating film for abrasion which is obtainable by using the surface treating agent according to Item (34).

(37) A non-wetting coating film, which is obtainable by using the surface treating agent according to Item (34).

(38) An antifouling coating film, which is obtainable by using the surface treating agent according to Item (34).

(39) A sliding coating film, which is obtainable by using the surface treating agent according to Item (34).

(40) An antireflection coating film, which is obtainable by using the surface treating agent according to Item (34).

(41) An insulating coating film, which is obtainable by using the surface treating agent according to Item (34).

The invention provides a novel polymer containing fluorosilsesquioxane. Further, the invention provides novel applications of the silsesquioxane compound, such as an application of the compound as a coating material, and an application of the compound as a modifying agent for a matrix resin. Still further, the invention provides an application of a copolymer of the silsesquioxane compound and organopolysiloxane as a surface modifying agent, and an application as a coating obtained by using the surface modifying agent. The surface modifying agent does not use a Freon-based solvent which affects the environment, and is useful as a coating material having good coating properties to adherends (hereinafter, also referred to as "substrate") such as a plastic film, glass, and a metal. The coating film which is obtainable by applying the surface modifying agent to the adherend exerts excellent non-wetting properties, antifouling-properties, nonstick, releasability, sliding properties, abrasion resistance, corrosion resistance, electrical insulating properties, antireflection properties, fire retardancy, antistatic properties, chemical resistance, and weather resistance.

BEST MODE FOR CARRYING OUT THE INVENTION

Figure 1:
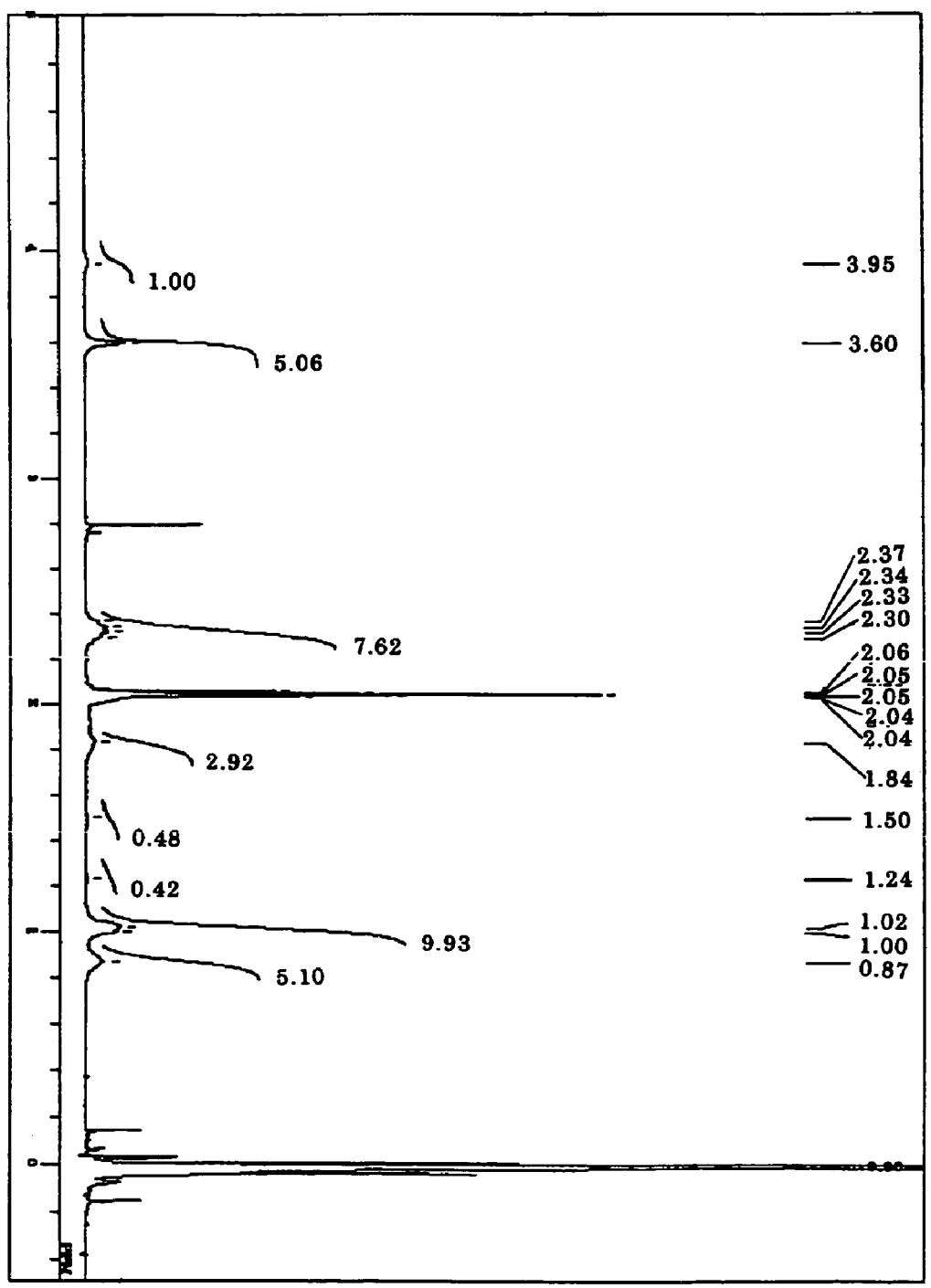
FIG. 1 shows a $^1$H-NMR spectrum chart of a polymer A5 obtained in Example 5.
Figure 2:
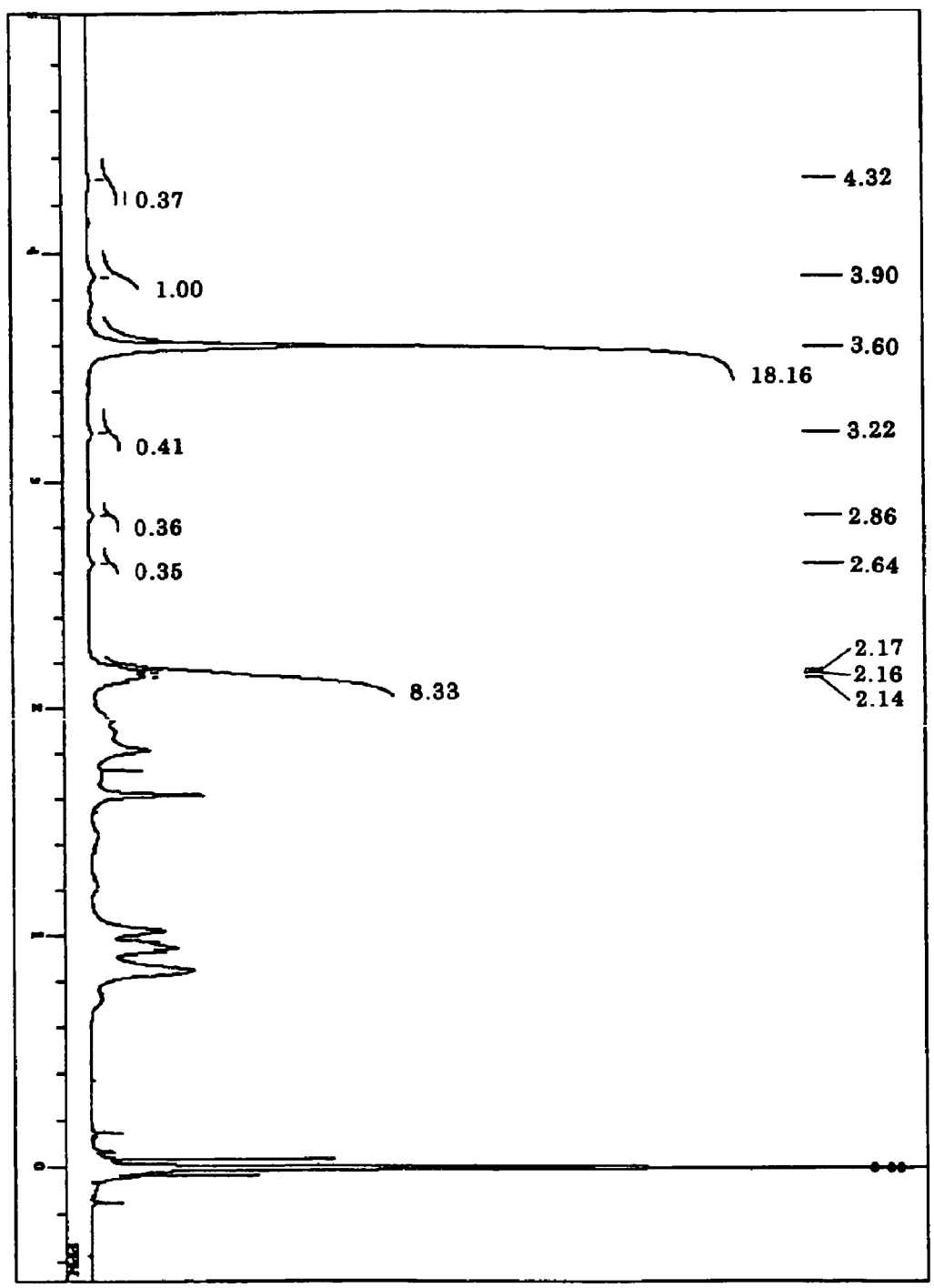
FIG. 2 shows a $^1$H-NMR spectrum chart of a polymer A8 obtained in Example 8.

The polymer of the invention is an addition polymer of fluorosilsesquioxane (a) having one addition polymerizable functional group, or an addition copolymer of the fluorosilsesquioxane (a) and another addition polymerizable monomer (b). Further, the invention relates to an addition copolymer of the fluorosilsesquioxane (a) having one addition polymerizable functional group and organopolysiloxane (c) having an addition polymerizable functional group, or an addition copolymer of the fluorosilsesquioxane (a) having one addition polymerizable functional group, the organopolysiloxane (c) having an addition polymerizable functional group, and an addition polymerizable monomer (b).

(Fluorosilsesquioxane (a))

Fluorosilsesquioxane (a) (hereinafter, also referred to as "silsesquioxane (a)") having one addition polymerizable functional group, which is a raw material monomer of the polymer of the invention, has a silsesquioxane structure in its molecular structure. "Silsesquioxane" is a generic term of polysiloxane and represented by $[(R—SiO_{1.5})_n]$ (in the formula, R represents an arbitrary substituent). The silsesquioxane structure is generally classified into following classes: a random structure, a ladder structure, and a cage structure, depending on its Si—O—Si structure. The cage structure is further classified into a $T_8$ type, a $T_{10}$ type, a $T_{12}$ type, and the like. Of those, the fluorosilsesquioxane (a) to be used in the invention preferably has the cage structure of $T_8$ type $[(R—SiO_{1.5})_8]$.

The above-mentioned fluorosilsesquioxane (a) is characterized by having one addition polymerizable functional group. In other words, one of R's of silsesquioxane $[(R—SiO_{1.5})_n]$ is an addition polymerizable functional group.

Examples of the above-mentioned addition polymerizable functional group include: a group having a terminal olefin type or an inner olefin type radical polymerizable functional group; a group having a cationic polymerizable functional group such as a vinyl ether and a propenyl ether; and a group having an anionic polymerizable functional group such as a vinyl carboxyl and a cyanoacryloyl, and preferably a radical polymerizable functional group.

The kind of the radical polymerizable functional group is not particularly limited as long as the group undergoes radical polymerization. Examples of the radical polymerizable functional group include a methacryloyl, an acryloyl, an allyl, a styryl, an α-methylstyryl, avinyl, avinyl ether, avinyl ester, an acrylamide, a methacrylamide, an N-vinyl amide, a maleate, a fumarate, and an N-substituted maleimide. Of those, the group containing (meth)acryl or styryl is preferable. Here, the term "(meth)acryl" is the generic term of an acryl and a methacryl, and refers to an acryl and/or a methacryl. Same holds true in the following.

An example of the above-mentioned radical polymerizable functional group having a (meth)acryl includes a group represented by the following formula (II). In the formula (II), $Y^2$ represents alkylene having 2 to 10 carbon atoms, preferably alkylene having 2 to 6 carbon atoms, and more preferably an alkylene (propylene) having 3 carbon atoms. X represents hydrogen or alkyl having 1 to 3 carbon atoms, or preferably hydrogen or methyl.

Further, an example of the above-mentioned radical polymerizable functional group having a styryl includes a group represented by the following formula (III). In the formula (III), $Y^2$ represents a single bond or alkylene having 1 to 10 carbon atoms, preferably a single bond or alkylene having 1 to 6 carbon atoms, or more preferably a single bond or an alkylene (ethylene) having 2 carbon atoms. Further, a vinyl binds to any one of carbon atoms of the benzene ring, preferably a carbon atom at the para position against $Y^2$.

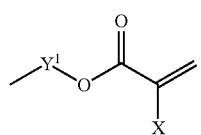

(II)

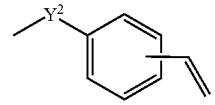

(III)

The fluorosilsesquioxane (a) is characterized by having at least one fluoroalkyl, fluoroarylalkyl, or fluoroaryl. In other words, at least one of R's of silsesquioxane $(R—SiO_{1.5})_n$, or preferably all of R's other than the addition polymerizable functional group are each fluoroalkyl, fluoroarylalkyl, and/or fluoroaryl.

The above-mentioned fluoroalkyl may be in a linear form or a branched chain form. The fluoroalkyl has 1 to 20 carbon atoms, or preferably 3 to 14 carbon atoms. Further, arbitrary methylene of the fluoroalkyl may be substituted by oxygen. Here, the methylene includes —$CH_2$—, —CFH—, or —$CF_2$—. That is, the phrase "arbitrary methylene of the fluoroalkyl may be substituted by oxygen" means that any one of —$CH_2$—, —CFH—, and —$CF_2$— may be substituted by —O—. Note that there is no case where two oxygen atoms are bound with each other (namely, —O—O—) in the fluoroalkyl. That is, the fluoroalkyl may have an ether bond. Further, in preferable fluoroalkyl, a methylene adjacent to Si is not substituted by oxygen and a terminal of the fluoroalkyl opposite to Si side is $CF_3$. Further, it is preferable that —$CF_2$— is substituted by oxygen rather than —$CH_2$— or —CFH— be substituted by oxygen. Specific examples of the fluoroalkyl include 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, a henicosafluoro-1,1,2,2-tetrahydrododecyl, and a pentacosafluoro-1,1,2,2-tetrahydrotetradecyl, (3-heptafluoroisopropoxy)propyl. Of those, a perfluoroalkylethyl is preferably exemplified.

The fluoroarylalkyl group is alkyl which includes alkyl containing fluorine and has preferably 7 to 20 carbon atoms, or more preferably 7 to 10 carbon atoms. The fluorine to be contained is preferably fluorine or trifluoromethyl by which arbitrary one or two or more of hydrogen of the aryl are substituted. Examples of the aryl moiety include a heteroaryl in addition to phenyl, a naphthyl, and the like. Examples of the alkyl moiety include methyl, ethyl, and propyl.

The fluoroaryl is a substituted aryl in which arbitrary one or two or more of hydrogen thereof are substituted by fluorine or trifluoromethyl, and has preferably 6 to 20 carbon atoms, or more preferably 6 carbon atoms. Examples of the aryl group include a heteroaryl in addition to phenyl, a naphthyl, and the like. Specific examples of the aryl include a fluorophenyl such as pentafluorophenyl, and a trifuloromethyl.

Of the fluoroalkyl, fluoroarylalkyl, and fluoroaryl, which are included in fluorosilsesquioxane (a), the preferable group is fluoroalkyl, more preferably perfluoroalkylethyl, and still more preferably 3,3,3-trifluoroproply or 3,3,4,4,5,5,6,6,6-nonafluorohexyl.

As described above, a preferable fluorosilsesquioxane (a) has a $T_8$-type structure and one addition polymerizable functional group, and further one or two or more of fluoroalkyl, fluoroarylalkyl and/or fluoroaryl, and is represented by the following the structure formula (I).

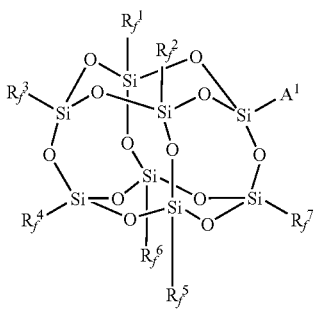

(I)

In the above formula (I), $A^1$ preferably represents the above-mentioned radical polymerizable functional group, and each of $R_f^1$ to $R_f^7$ preferably independently represents the above-mentioned fluoroalkyl, fluoroarylalkyl, or fluoroaryl. $R_f^1$ to $R_f^7$ may be groups different from each other, or, all of them may be the same groups.

(Addition Polymerizable Monomer (b))

Examples of the addition polymerizable monomer include one which has a crosslinking group and one which has no crosslinking group. The addition polymerizable monomer (b) having a crosslinking group may be a compound having one or two or more of addition polymerizable double bonds. Examples of the addition polymerizable monomer (b) include anyone of a vinyl compound, a vinylidene compound, and vinylene compound, and specific examples thereof include a (meth)acrylic compound and a styrene compound.

Examples of the (meth)acrylic compound include (meth)acrylamide and (meth)acrylonitrile in addition to (meth)acrylic acid and (meth)acrylates.

An example of the (meth)acrylic compound of the addition polymerizable monomer (b) includes (meth)acrylates having a crosslinking functional group. Examples of the crosslinking functional group include epoxy such as glycidyl and epoxycyclohexyl, oxetanyl, isocyanato, acid anhydride, carboxyl, and hydroxyl. Of those, epoxy such as glycidyl and oxetanyl is preferable. Specific examples of the (meth)acrylates having a crosslinking functional group include: hydroxyalkyl (meth)acrylates such as (meth)acrylic acid, 2-hydroxyethyl(meth)acrylate, and 2-hydroxypropyl(meth)acrylate; epoxy-containing (meth)acrylates such as glycidyl(meth)acrylate; alicyclic epoxy-containing (meth)acrylates such as 3,4-epoxycyclohexylmethyl (meth)acrylate; oxetanyl-containing (meth)acrylates such as 3-ethyl-3-(meth)acryloyloxymethyloxetane; 2-(meth)acryloyloxyethyl isocyanate; γ-(methacryloyloxypropyl)trimethoxysilane; (meth)acrylate-2-aminoethyl, 2-(2-bromopropionyloxy)ethyl(meth)acrylate, and 2-(2-bromoisobutyryloxy)ethyl(meth)acrylate; and 1-(meth)acryloxy-2-phenyl-2-(2,2,6,6-tetramethyl-1-piperidinyloxy) ethane, 1-(4-((4-(meth)acryloxy)ethoxyethyl)phenylethoxy) piperidine, 1,2,2,6,6-pentamethyl-4-piperidyl(meth)acrylate, and 2,2,6,6-pentamethyl-4-piperidyl(meth)acrylate.

Examples of the styrene compound having one addition polymerizable double bond include a styrene compound having a crosslinking functional group. Specific examples of the crosslinking functional group include epoxy such as glycidyl, oxetanyl, halo, amino, isocyanato, acid anhydride, carboxyl, hydroxyl, thiol, and siloxy.

Examples of the styrene compound having a crosslinking functional group include o-aminostyrene, p-styrenechloro-sulfonic acid, styrenesulfonic acid and salts thereof, vinylphenylmethyldithiocarbamate, 2-(2-bromopropyonyloxy)styrene, 2-(2-bromoisobutyryloxy)styrene, 1-(2-((4-vinylphenyl)methoxy)-1-phenylethoxy)-2,2,6,6-tetramethylpiperidine, and compounds represented by the following formulae.

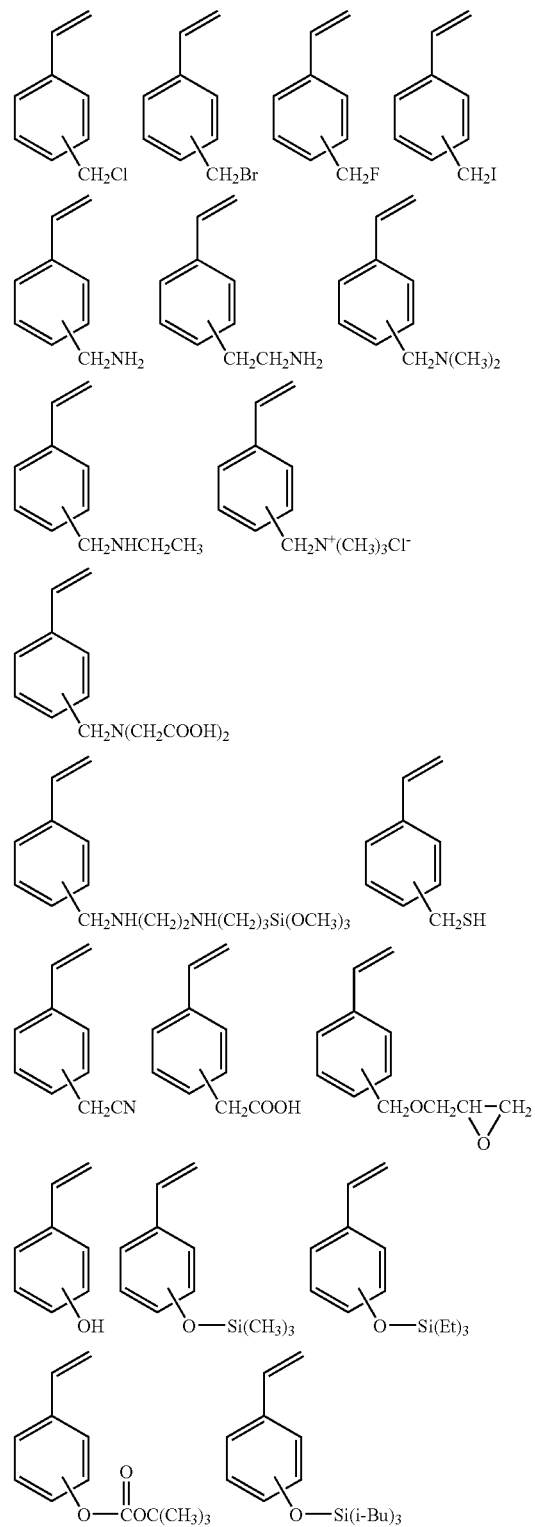

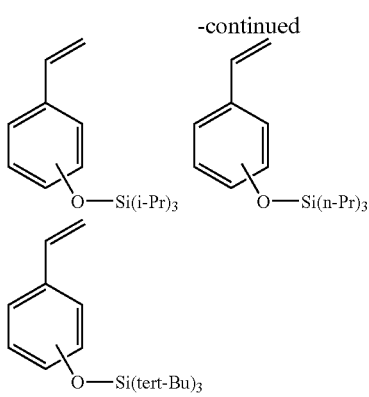

In addition to the addition polymerizable monomer (b), an addition polymerizable monomer (b) other than the above mentioned addition polymerizable monomer may be used in combination if required, in order to control releasing performance, compatibility with an epoxy resin, leveling properties, an amount of crosslinking functional groups in a copolymer, and the like.

Examples of the addition polymerizable monomer (b) having no crosslinking functional group include a (meth)acrylic compound which has one addition polymerizable double bond and has no crosslinking functional group, and a styrene compound which has one addition polymerizable double bond and has no crosslinking functional group. Specific examples of the (meth)acrylic compound include: alkyl (meth)acrylates such as methyl(meth)acrylate, ethyl(meth)acrylate, n-propyl(meth)acrylate, isopropyl(meth)acrylate, butyl(meth)acrylate, isobutyl(meth)acrylate, t-butyl(meth)acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth) acrylate, decyl(meth)acrylate, dodecyl(meth)acrylate, and stearyl(meth)acrylate; aryl(meth)acrylates such as phenyl (meth)acrylate and tolyl(meth)acrylate; arylalkyl(meth)acrylates such as benzyl(meth)acrylate; alkoxyalkyl(meth)acrylates such as 2-methoxyethyl(meth)acrylate, 3-methoxypropyl(meth) acrylate, and 3-methoxybutyl(meth) acrylate; and ethylene oxide adducts of (meth)acrylic acid.

The specific examples of the (meth)acrylic compound which has one addition polymerizable double bond and has no crosslinking functional group further includes fluoroalkyl (meth)acrylates such as trifluoromethylmethyl(meth)acrylate, 2-trifluoromethylethyl(meth)acrylate, 2-perfluoroethylethyl(meth)acrylate, 2-perfluoroethyl-2-perfluorobutylethyl (meth)acrylate, perfluoroethyl(meth)acrylate, trifluoromethyl(meth)acrylate, diperfluoromethylmethyl (meth)acrylate, 2-perfluoromethyl-2-perfluoroethylethyl (meth)acrylate, 2-perfluorohexylethyl(meth)acrylate, 2-perfluorodecylethyl(meth)acrylate, and 2-perfluorohexadecylethyl(meth)acrylate.

The examples of the (meth)acrylic compound which has one addition polymerizable double bond and has no crosslinking functional group further includes (meth)acrylic compounds having a silsesquioxane structure. Examples of the (meth)acrylic compound having a silsesquioxane structure include 3-(3,5,7,9,11,13,15-heptaethylpentacyclo[9.5.1.1$^{3,9}$.1$^{5,15}$.1$^{7,13}$]octasiloxan-1-yl)propyl(meth)acrylate, 3-(3,5,7,9,11,13,15-heptaisobutyl-pentacyclo[9.5.1.1$^{3,9}$.1$^{5,15}$.1$^{7,13}$]octasiloxan-1-yl)propyl(meth)acrylate, 3-(3,5,7,9,11,13,15-heptaisooctylpentacyclo[9.5.1.1$^{3,9}$.1$^{5,15}$.1$^{7,13}$]octasiloxan-1-yl)propyl(meth)acrylate, 3-(3,5,7,9,11,13,15-heptacyclopentylpentacyclo[9.5.1.1$^{3,9}$.1$^{5,15}$.1$^{7,13}$]octasiloxan-1-yl)propyl(meth)acrylate, 3-(3,5,7,9,11,13,15-heptaphenylpentacyclo[9.5.1.1$^{3,9}$.1$^{5,15}$.1$^{7,13}$]octasiloxan-1-yl)propyl(meth)acrylate, 3-(3,5,7,9,11,13,15-heptaethylpentacyclo[9.5.1.1$^{3,9}$.1$^{5,15}$.1$^{7,13}$]octasiloxan-1-yloxy)dimethylsilyl]propyl(meth)acrylate, 3-[(3,5,7,9,11,13,15-heptaisobutylpentacyclo[9.5.1.1$^{3,9}$.1$^{5,15}$.1$^{7,13}$] octasiloxan-1-yloxy)dimethylsilyl]propyl(meth)acrylate, 3-(3,5,7,9,11,13,15-heptaisooctylpentacyclo[9.5.1.1$^{3,9}$.1$^{5,15}$.1$^{7,13}$]octasiloxan-1-yloxy)dimethylsilyl]propyl(meth) acrylate, 3-[(3,5,7,9,11,13,15-heptacyclopentylpentacyclo [9.5.1.1$^{3,9}$.1$^{5,15}$.1$^{7,13}$]octasiloxan-1-yloxy)dimethylsilyl] propyl(meth)acrylate, and 3-[(3,5,7,9,11,13,15-heptaphenylpentacyclo[9.5.1.1$^{3,9}$.1$^{5,15}$.1$^{7,13}$]octasiloxan-1-yloxy)dimethylsilyl]propyl(meth)acrylate.

Specific examples of the styrene compound which has one addition polymerizable double bond and has no crosslinking functional group include styrene, vinyltoluene, α-methylstyrene, and ρ-chlorostyrene.

The examples of the styrene compound which has one addition polymerizable double bond and has no crosslinking functional group further include the styrene compounds each having silsesquioxane. Examples of the styrene derivatives having silsesquioxane include: octasiloxanes ($T_8$-type silsesquioxane) each having 4-vinylphenyl, such as 1-(4-vinylphenyl)-3,5,7,9,11,13,15-heptaethylpentacyclo[9.5.1.1$^{3,9}$.1$^{5,15}$.1$^{7,13}$]octasiloxane, 1-(4-vinylphenyl)-3,5,7,9,11,13,15-heptaisobutylpentacyclo[9.5.1.1$^{3,9}$.1$^{5,15}$.1$^{7,13}$]octasiloxane, 1-(4-vinylphenyl)-3,5,7,9,11,13,15-heptaisooctylpentacyclo [9.5.1.1$^{3,9}$.1$^{5,15}$.1$^{7,13}$]octasiloxane, 1-(4-vinylphenyl)-3,5,7,9,11,13,15-heptacyclopentylpentacyclo[9.5.1.1$^{3,9}$.1$^{5,15}$.1$^{7,13}$]octasiloxane, and 1-(4-vinylphenyl)-3,5,7,9,11,13,15-heptaphenylpentacyclo[9.5.1.1$^{3,9}$.1$^{5,15}$.1$^{7,13}$]octasiloxane; and octasiloxanes ($T_8$-type silsesquioxane) each having 4-vinylphenylethyl, such as 3-(3,5,7,9,11,13,15-heptaethylpentacyclo[9.5.1.1$^{3,9}$.1$^{5,15}$.1$^{7,13}$]octasiloxan-1-yl)ethylstyrene, 3-(3,5,7,9,11,13,15-heptaisobutylpentacyclo[9.5.1.1$^{3,9}$.1$^{5,15}$.1$^{7,13}$]octasiloxan-1-yl)ethylstyrene, 3-(3,5,7,9,11,13,15-heptaisooctylpentacyclo[9.5.1.1$^{3,9}$.1$^{5,15}$.1$^{7,13}$]octasiloxan-1-yl)ethylstyrene, 3-(3,5,7,9,11,13,15-heptacyclopentylpentacyclo[9.5.1.1$^{3,9}$.1$^{5,15}$.1$^{7,13}$]octaoctasiloxan-1-yl)ethylstyrene, 3-(3,5,7,9,11,13,15-heptaphenylpentacyclo [9.5.1.1$^{3,9}$.1$^{5,15}$.1$^{7,13}$]octasiloxan-1-yl)ethylstyrene, 3-((3,5,7,9,11,13,15-heptaethylpentacyclo[9.5.1.1$^{3,9}$.1$^{5,15}$.1$^{7,13}$] octasiloxan-1-yloxy)dimethylsilyl)ethylstyrene, 3-((3,5,7,9,11,13,15-heptaisobutylpentacyclo[9.5.1.1$^{3,9}$.1$^{5,15}$.1$^{7,13}$] octasiloxan-1-yloxy)dimethylsilyl)ethylstyrene, 3-((3,5,7,9,11,13,15-heptaisooctylpentacyclo[9.5.1.1$^{3,9}$.1$^{5,15}$.1$^{7,13}$] octasiloxan-1-yloxy)dimethylsilyl)ethylstyrene, 3-((3,5,7,9,11,13,15-heptacyclopentylpentacyclo[9.5.1.1$^{3,9}$.1$^{5,15}$.1$^{7,13}$] octasiloxan-1-yloxy)dimethylsilyl)ethylstyrene, and 3-((3,5,7,9,11,13,15-heptaphenylpentacyclo[9.5.1.1$^{3,9}$.1$^{5.15}$.1$^{7,13}$] octasiloxan-1-yloxy)dimethylsilyl)ethylstyrene.

Further, the examples of the addition polymerizable monomer (b) other than the above mentioned addition polymerizable monomer include macromonomers each having: a main chain which is induced from styrene, (meth)acrylates, siloxane, or alkylene oxides such as ethylene oxide and propylene oxide; and one polymerizable double bond.

The examples of the addition polymerizable monomer (b) also include a compound having two addition polymerizable double bonds.

Examples of the compound having two addition polymerizable double bonds include di(meth)acrylate-based monomers such as 1,3-butanediol=di(meth)acrylate, 1,4-butanediol=di(meth)acrylate, 1,6-hexanediol=di(meth) acrylate, polyethylene glycol=di(meth)acrylate, diethylene glycol=di(meth)acrylate, neopentyl glycol=di(meth)acrylate, triethylene glycol=di(meth)acrylate, tripropylene glycol=di(meth)acrylate, hydroxypivalate neopentyl glycol=di(meth)acrylate, trimethylolpropane=di(meth)acrylate, bis[(meth)acryloyloxyethoxy]bisphenol A, bis[(meth)acryloyloxyethoxy]tetrabromobisphenol A, bis[(meth)acryloxypolyethoxy]bisphenol A, 1,3-bis(hydroxyethyl)5,5-dimethylhydantoin, 3-methylpentanediol=di(meth)acrylate, di(meth)acrylates of hydroxypivalate neopentyl glycol compounds, and bis[(meth)acryloyloxypropyl]tetramethyldisiloxane; and divinylbenzene.

The examples further include macromonomers each having a main chain which is induced from styrene, (meth)acrylates, siloxane, or alkylene oxides such as ethylene oxide and propylene oxide, and two polymerizable double bonds.

The examples of the addition polymerizable monomer (b) also include a compound having three or more of addition polymerizable double bonds. Examples of the compound having three or more or addition polymerizable double bonds include trimethylolpropane=tri(meth)acrylate, pentaerythritol=tri(meth)acrylate, pentaerythritol=tetra(meth)acrylate, dipentaerythritol=monohydroxypenta(meth)acrylate, tris(2-hydroxyethylisocyanate)=tri(meth)acrylate, tris(diethylene glycol)trimelate=tri(meth)acrylate, 3,7,14-tris[(((meth)acryloyloxypropyl)dimethylsiloxy)]-1,3,5,7,9,11,14-heptaethyltricyclo[7.3.3.1$^{5,11}$]heptasiloxane, 3,7,14-tris[(((meth)acryloyloxypropyl)dimethylsiloxy)]-1,3,5,7,9,11,14-heptaisobutyltricyclo[7.3.3.1$^{5,11}$]heptasiloxane, 3,7,14-tris[(((meth)acryloyloxypropyl)dimethylsiloxy)]-1,3,5,7,9,11,14-heptaisooctylltricyclo[7.3.3.1$^{5,11}$]heptasiloxane, 3,7,14-tris[(((meth)acryloyloxypropyl)dimethylsiloxy)]-1,3,5,7,9,11,14-heptacyclopentyltricyclo[7.3.3.1$^{5,11}$]heptasiloxane, 3,7,14-tris[(((meth)acryloyloxypropyl)dimethylsiloxy)]-1,3,5,7,9,11,14-heptaphenyltricyclo[7.3.3.1$^{5,11}$]heptasiloxane, octakis(3-(meth)acryloyloxypropyldimethylsiloxy)octasilsesquioxane, and octakis(3-(meth)acryloyloxypropyl)octasilsesquioxane.

The examples further include macromonomers each having a main chain which is induced from styrene, (meth)acrylates, siloxane, or alkylene oxides such as ethylene oxide and propylene oxide, and three or more of polymerizable double bonds.

The addition polymerizable monomer (b) is preferably a (meth)acrylic compound, more preferably (meth)acrylates, and still more preferably a lower alkyl (for example, 1 to 3 carbon atoms) ester and an ester having a crosslinking functional group of (meth)acrylic acid.

The polymer of the invention into which a crosslinking functional group is induced can be obtained by making at least a part of the addition polymerizable monomer (b) to be an addition polymerizable monomer having a crosslinking functional group. The polymer of the invention into which a crosslinking functional group is induced may be used as a surface modifying agent for a matrix resin as described later.

(Organopolysiloxane (c))

Organopolysiloxane (hereinafter, also referred to as "silicone" or "polysiloxane") exemplified by polydimethylsiloxane has specific properties such as water repellency, releasability, sliding properties, low abrasion properties, heat resistance, and oxygen permeability. Therefore, organopolysiloxane has been used in a wide range of applications mainly in the electronic material field, cosmetic and medical fields, and the like.

For instance, use of organopolysiloxane having a polymerizable functional group as a copolymerization component or a polycondensation component of another organic polymer can easily provide properties due to the organopolysiloxane, such as weather resistance, surface water repellency, lubricant properties, biocompatibility, and gas permeability. There is known organopolysiloxane having various kinds of organic functional groups to modify an organic polymer. For example, organopolysiloxane having carboxyl, that is carboxylic acid mono-terminated organopolysiloxane, is useful as a fiber treating agent, an emulsifier, a surface modifying agent for inorganic materials, or a modifying agent for various resins such as an epoxy resin, a polyester, an alkyl resin, and a urethane resin. Further, organopolysiloxane having various kinds of functional groups can be synthesized by introducing various kinds of functional groups into the organopolysiloxane by utilizing reactivity of the carboxyl. For instance, the carboxyl may be an amide or an ester. As described above, the carboxylic acid mono-terminated organopolysiloxane is utilized in preparation of various kinds of modified silicones. JP 10-001537 A discloses a polyester modification by a carboxylic acid bi-terminated polysiloxane, and JP 07-068424 B discloses an improvement in cold resistance of an acryl rubber composition obtained by using a carboxylic acid modified silicone, and improvements in releasability and roll processability of the rubber, which are provided by the acryl rubber composition. Further, JP 09-059125 A discloses a water-repellent powder for cosmetic use which is obtained by processing a powder with carboxyl modified organopolysiloxane. JP 08-109263 A discloses the use of a bi-terminal and side-chain carboxylic acid modified polysiloxane as a polyvalent metal salt modified polysiloxane and an application thereof as a gelling agent or cosmetics. Further, JP 05-139997 A discloses a transdermal absorption promoting agent which promotes permeation and absorption of drugs via skin by using carboxylic acid mono-terminated silicone.

Organopolysiloxane having an addition polymerizable functional group, which is a raw material monomer of the polymer of the invention, preferably has a molecular structure represented by the following formula (IV).

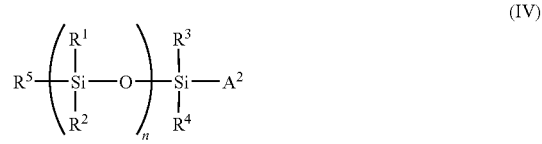

(IV)

In the formula (IV), which represents the organopolysiloxane (c) to be used in the invention, n preferably represents an integer of 1 to 1,000, $R^1$, $R^2$, $R^3$, $R^4$, and $R^5$ each preferably represent a group independently selected form the group consisting of: hydrogen; alkyl having 1 to 30 carbon atoms, arbitrary hydrogen thereof may be substituted by fluorine, and arbitrary —$CH_2$— may be substituted by —O— or cycloalkylene; substituted or unsubstituted aryl; and arylalkyl composed of substituted or unsubstituted aryl and alkylene having arbitrary hydrogen thereof may be substituted by fluorine and arbitrary —$CH_2$— thereof may be substituted by —O— or cycloalkylene; and $A^2$ preferably represents an addition polymerizable functional group.

Further, in the formula (IV), which represents the organopolysiloxane (c) to be used in the invention, $R^1$ and $R^2$ each preferably independently represent hydrogen, phenyl, or alkyl having 1 to 8 carbon atoms and arbitrary hydrogen thereof may be substituted by fluorine;

$R^3$ and $R^4$ each preferably independently represent alkyl having 1 to 20 carbon atoms and arbitrary hydrogen thereof may be substituted by fluorine, aryl having 6 to 20 carbon atoms and arbitrary hydrogen thereof may be substituted by fluorine, or arylalkyl having 7 to 20 carbon atoms and arbitrary hydrogen thereof may be substituted by fluorine; and $R^5$ preferably represents alkyl having 1 to 20 carbon atoms and arbitrary hydrogen thereof may be substituted by fluorine, aryl having 6 to 20 carbon atoms and arbitrary hydrogen thereof may be substituted by fluorine, or arylalkyl having 7 to 20 carbon atoms and arbitrary hydrogen thereof may be substituted by fluorine.

Further, in the formula (IV), which represents the organopolysiloxane (c) to be used in the invention, $R^1$ and $R^2$ each preferably independently represent methyl, phenyl, or 3,3,3-trifluoropropyl;

$R^3$ and $R^4$ each preferably independently represent methyl or phenyl; and $R^5$ preferably represents methyl, ethyl, propyl, butyl, isobutyl, or phenyl.

Further, in the formula (IV), which represents the organopolysiloxane (c) to be used in the invention, $R^1$, $R^2$, $R^3$, and $R^4$ each preferably simultaneously represent methyl. In addition, in the formula (IV), $A^2$ preferably represents an addition polymerizable functional group, $A^2$ preferably represents a radical polymerizable functional group, $A^2$ preferably includes (meth)acryl or styryl, and $A^2$ preferably represents any one represented by the following formulae (V), (VI), and (VII).

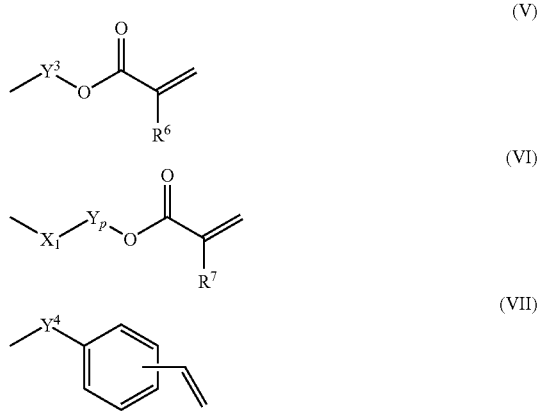

(In the formula (V), $Y^3$ represents alkylene having 2 to 10 carbon atoms, and $R^6$ represents hydrogen, linear or branched alkyl having 1 to 5 carbon atoms, or aryl having 6 to 10 carbon atoms. In the formula (VI), $R^7$ represents hydrogen, linear or branched alkyl having 1 to 5 carbon atoms, or aryl having 6 to 10 carbon atoms, $X_1$ represents alkylene having 2 to 20 carbon atoms, Y represents —OCH$_2$CH$_2$—, —OCH(CH$_3$)CH$_2$—, or —OCH$_2$CH(CH$_3$)—, and p represents an integer of 0 to 3. In the formula (VII), $Y^4$ represents a single bond or alkylene having 1 to 10 carbon atoms.)

In the invention, in the formula (V), $Y^3$ preferably represents alkylene having 2 to 6 carbon atoms, and $R^6$ preferably represents hydrogen or alkyl having 1 to 3 carbon atoms, in the formula (VI), $X_1$ preferably represents —CH$_2$CH$_2$CH$_2$—, Y preferably represents —OCH$_2$CH$_2$—, p preferably represents an integer of 0 or 1, and $R^7$ preferably represents hydrogen or alkyl having 1 to 3 carbon atoms, and in the formula (V), $Y^4$ preferably represents a single bond or alkylene having 1 or 2 carbon atoms.

Examples of the organopolysiloxane to be preferably used in the invention include SILAPLANE FM0711 (manufactured by CHISSO CORPORATION), SILAPLANE FM0721 (manufactured by CHISSO CORPORATION), SILAPLANE FM0725 (manufactured by CHISSO CORPORATION), SILAPLANE TM0701 (manufactured by CHISSO CORPORATION), and SILAPLANE TM0701T (manufactured by CHISSO CORPORATION).

(Addition Polymer)

The polymer of the invention is an addition polymer of silsesquioxane (a), or, an addition copolymer of the silsesquioxane (a) and another addition polymerizable monomer (b). When the polymer of the invention is the copolymer, the copolymer may be any one of a regular copolymer such as a block copolymer and a random copolymer, and preferably a random copolymer. In the case of an addition copolymer of the silsesquioxane (a) and organopolysiloxane (c) or an addition copolymer of the silsesquioxane (a), organopolysiloxane (c), and another addition polymerizable monomer (b), the polymer of the invention may be any one of a regular copolymer such as a block copolymer and a random copolymer, and preferably a random copolymer. Further, the polymer of the invention may have a crosslinking structure or be a graft copolymer.

The polymer of the invention preferably includes at least a structure unit (hereinafter, referred to as "structure unit (a)") derived from silsesquioxane (a), and a structure unit (hereinafter, referred to as "structure unit (b)") derived from a monomer (b).

In the polymer of the invention, the molar ratio between the structural unit (a) and the structural unit (b) is arbitrary, and may be in a range where (a):(b) is about 100:0 to about 0.001:99.999. As described later, when the polymer of the invention is used as a surface modifying agent, the molar ratio is preferably in a range where (a):(b) is about 50:50 to about 0.001:99.999. The polymer of the invention needs to include the structural unit (a) to some extent to exert sufficient surface modifying performance, and the content of the structure unit (a) is preferably in the above range in order that the polymer of the invention has solubility in a solvent.

Further, the polymer of the invention preferably includes a structure unit derived from the silsesquioxane (a), and a structure unit (hereinafter, referred to as "structure unit (c)") derived from organopolysiloxane (c), and a structure unit derived from the monomer (b). The molar ratio between the structural unit (a), the structural unit (b), and the structural unit (c) is arbitrary, and may be in a range where (a):(b) is about 0.001:99.999 to about 99.999:0.001, (b):(c) is about 0.001:99.999 to about 99.999:0.001, and (a):(c) is about 0.1:99.9 to about 99.9:0.1. As described later, when the polymer of the invention is used as a surface modifying agent, the molar ratio is preferably in a range where (a):(b) is about 30:70 to about 60:40, (b):(c) is about 85:15 to about 99:1, and (a):(c) is about 80:20 to about 95:5.

Further, the content of fluorine atoms included in the polymer of the invention is preferably in the range of about 0.001 to 60 weight %.

The weight average molecular weight of the polymer of the invention has a standard of about 1,300 to 1,000,000, though it varies depending on the content of the structural unit (a) or the like. If the content of the structural unit (a) is large, the molecular weight tends to be small. On the other hand, the molecular weight distribution (Mw/Mn) of the polymer of the invention has a standard of about 1.01 to 2.5.

Further, of the structural units (b) included in the polymer of the invention, the ratio of a structural unit which is derived from an addition polymerizable monomer having a crosslinking functional group is not particularly limited. The structural unit may include the crosslinking functional group to such an extent that, when the copolymer is used as a coating agent by being blended with an epoxy-based resin that is a matrix resin to provide good compatibility between the copolymer and the matrix resin monomer, preferable reactivity between the copolymer and the matrix resin monomer can be obtained.

The polymer of the invention can be obtained by using fluorosilsesquioxane (a) and another addition polymerizable monomer (b) if required as raw materials of monomer, and by addition polymerizing them.

The molar ratio between the silsesquioxane (a) and another addition polymerizable monomer (b) which are included in the raw materials of monomer, may be arbitrarily determined depending on the polymer of interest. Further, the ratio of an addition polymerizable monomer having a crosslinking functional group, which is included in another addition polymerizable monomer (b), may be arbitrarily selected depending on the polymer of interest.

The polymer of the invention can also be obtained by using fluorosilsesquioxane (a), organopolysiloxane (c), and another addition polymerizable monomer (b) if required as raw materials of monomer, and by addition polymerizing them. The molar ratio between the silsesquioxane (a), organopolysiloxane (c), and another addition polymerizable monomer (b) which are included in the raw materials of monomer, may be arbitrarily determined depending on the polymer of interest. Further, the ratio of an addition polymerizable monomer having a crosslinking functional group or an addition polymerizable monomer having no crosslinking functional group, which is included in another addition polymerizable monomer (b), may be arbitrarily selected depending on the polymer of interest. In the case where some kinds of monomers are used as the addition polymerizable monomer (b) having a crosslinking functional group, the ratio of the respective monomers may be determined depending on the properties of the copolymer of interest. Further, the ratio of the addition polymerizable monomer (b) having a crosslinking functional group, which is included in the another addition polymerizable monomer (b), may be determined depending on the properties of the copolymer of interest. Radical copolymerization is preferable in view of simplicity and generality.

Addition polymerization can be carried out using a polymerization initiator.

Examples of the polymerization initiator to be used include radical polymerization initiators such as: azo compounds such as 2,2'-azobisisobutyronitrile, 2,2'-azobis(2,4-dimethylvaleronitrile), 2,2'-azobis(2-butyronitrile), dimethyl-2,2'-azobisisobutylate, and 1,1'-azobis(cyclohexane-1-carbonitrile); peroxides such as benzyl peroxide, lauryl peroxide, octanoyl peroxide, acetyl peroxide, di-t-butyl peroxide, t-butylcumyl peroxide, dicumyl peroxide, t-butylperoxy acetate, t-butylperoxy benzoate, and t-butylperoxy neodecanoate; and dithiocarbamates such as tetraethylthiuramdisulfide.

Further, examples of the polymerization reaction include living radical polymerization and photopolymerization.

Examples of the living radical polymerization include: atom transfer radical polymerization; reversible addition-fragmentation chain transfer; iodine transfer polymerization; and an inifeter polymerization, and those reactions may each be performed by using any one of polymerization initiators described in the following references A to C.

Reference A: Radical Polymerization Handbook, Mikiharu Kamachi and Takeshi Endo eds., issued on Aug. 10th, 1999, published by NTS. INC.).

Reference B: HANDBOOK OF RADICAL POLYMERIZATION, K. Matyjaszewski, T. P. Davis, Eds., John Wiley and Sons, Canada 2002

Reference C: JP 2005-105265 A

Photopolymerizaton can be performed by using a compound described in the reference D as a photopolymerization initiator.

Reference D: Photosensitive Material List book, The Technical Association of Photosensitive Polymers of Japan ed., Mar. 31, 1996, published by BUN-SHIN.

Specific examples of the photopolymerization initiator to be used are not particularly limited as long as the photopolymerization initiator is a compound which produces a radical by irradiation of ultraviolet ray or visible light. Examples of the compound to be used as the photopolymerization initiator (D) include benzophenone, Michler's ketone, 4,4'-bis(diethylamino)benzophenone, xanthone, thioxanthone, isopropylxanthone, 2,4,-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenylketone, isopropylbenzoinether, isobutylbenzoinether, 2,2-diethoxyacetophenone, 2,2-dimethoxy-2-phenylacetophenone, camphorquinone, benzanthrone, 2-methyl-1-[4-(methylthio)phenyl)]-2-morpholinopropan-1-one, 2-benzyl-2-dimethylamino-1-(4-morpholinophenyl)-butanone-1,4-dimethylamino ethylbenzoate, 4-dimethylamino isoamylbenzoate, 4,4'-di(t-butylperoxycarbonyl) benzophenone, 3,4,4'-tri(t-butylperoxycarbonyl) benzophenone, 2,4,6,-trimethylbenzoyldiphenylphosphineoxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzothiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1, 2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, 1-hydroxycyclohexylphenylketone, and bis($\eta^5$-2,4-cyclopentadien-1-yl)-bis-(2,6-difluoro-3-(1H-pyrrol-1-yl)-phenyl)titanium. Those compounds may be used alone, or two or more kinds of them may be effectively used in combination. 3,3',4,4'-tetra(t-butylperoxycarbonyl)benzophenone, 3,3',4, 4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl) benzophenone, 4,4'-di(methoxycarbonyl)-3,3'-di(t-butylperoxycarbonyl)benzophenone, and the like are preferable.

The amount of the polymerization initiator to be used in the addition polymerization may be about 0.01 to 10 mol % with respect to the total moles of the monomer.

Further, the addition polymerization may be carried out using a chain transfer agent. Use of the chain transfer agent can control the molecular weight of the polymer appropriately. Examples of the chain transfer agent include: mercaptans such as thio-β-naphthol, thiophenol, butylmercaptan, ethylthio glycolate, mercaptoethanol, mercaptoacetic acid, isopropylmercaptan, t-butylmercaptan, dodecanethiol, thiomalic acid, pentaerythritoltetra(3-mercaptopropionate), and pentaerythritoltetra(3-mercaptoacetate); disulfides such as diphenyl disulfide, diethyldithioglycolate, and diethyl disulfide; toluene; methyl isobutyrate; carbon tetrachloride; isopropyl benzene; diethyl ketone; chloroform; ethyl benzene; butyl chloride; s-butyl alcohol; methylethylketone; methylisobutylketone; propylene chloride; methylchloroform; t-butyl benzene; butyl alcohol; isobutyl alcohol; acetic acid; ethyl acetate; acetone; dioxane; tetrachloroethane; chlorobenzene; methylcyclohexane; t-butyl alcohol; and benzene. In particular, mercaptoacetic acid reduces a molecular weight of a polymer and realizes a uniform molecular weight distribution of the polymer.

One kind or a mixture of two or more kinds of the chain transfer agents may be used.

Specific production method of the polymer of the invention may be the same as those of general addition polymers. The production method can involve, for example, a solution polymerization method, an emulsification polymerization method, a suspension polymerization method, a bulk polymerization method, a bulk-suspension polymerization method, and a polymerization methods using supercritical $CO_2$.

In the case of the solution polymerization method, an addition polymerization reaction may be carried out by: dissolving in an appropriate solvent fluorosilsesquioxane (a), and if required, a monomer (b), a polymerization initiator, a chain transfer agent, and the like; and heating or irradiating light to the mixture. Alternatively, an addition polymerization reaction may be carried out by: dissolving in an appropriate solvent fluorosilsesquioxane (a), organopolysiloxane (c), and if required, a monomer (b), a polymerization initiator, a chain transfer agent, and the like; and heating or irradiating light to the mixture.

Examples of the solvent to be used in the polymerization reaction include: hydrocarbon-based solvents such as benzene and toluene; ether-based solvents such as diethyl ether, tetrahydrofuran, diphenyl ether, anisole, and dimethoxybenzene; halogenated hydrocarbon-based solvents such as methylene chloride, chloroform, and chlorobenzene; ketone-based solvents such as acetone, methylethylketone, and methylisobutylketone; alcohol-based solvents such as methanol, ethanol, propanol, isopropanol, butyl alcohol, and t-butyl alcohol; nitrile-based solvents such as acetonitrile, propionitrile, and benzonitrile; ester-based solvents such as ethyl acetate and butyl acetate; carbonate-based solvents such as ethylene carbonate and propylene carbonate; amide-based solvents such as N,N-dimethylformamide and N,N-dimethylacetamide; hydrochlrofluorocarbon-based solvents such as HCFC-141b and HCFC-225; hydrofluorocarbon (HFCs)-based solvents such as HFCs having 2 to 4, or 5 or 6 or more carbon atoms; perfluorocarbon-based solvents such as perfluoropentane and perfluorohexane; alicyclic hydrofluorocarbon-based solvents such as fluorocyclopentane and fluorocyclobutane; oxygen-containing fluorine-based solvents such as fluoroether, fluoropolyether, fluoroketone, and fluoroalcohol; aromatic fluorine-based solvents such as α,α,α-trifluorotoluene and hexafluorobenzene; and water. Any one kind of those solvents may be used alone, or two or more kinds of them may be used in combination.

The amount of the solvent to be used may be determined such that the concentration of monomer is about 10 to 80 weight %.

The reaction temperature is not particularly limited and may be about 0 to 200° C. as a standard, and preferably room temperature to about 150° C. The polymerization reaction may be performed under reduced pressure, normal pressure, or a pressure depending on kinds of the monomers and kind of the solvent.

The polymerization reaction may preferably be carried out in an inert gas atmosphere such as nitrogen or argon. The reason is as follows. Generated radicals are prevented from contacting with an oxygen atom so that the radicals can keep their activities and thus suppress a decrease in the polymerization rate, to thereby obtain a polymer having an appropriately controlled molecular weight. Moreover, the polymerization reaction may preferably be carried out in a polymerization system where dissolved oxygen is removed under reduced pressure (or the polymerization reaction may be carried out under reduced pressure after the removal of the dissolved oxygen under reduced pressure).

The polymer obtained in the solution may be purified or isolated according to conventional methods, or may be used in formation of coating or the like without being subjected to any process.

(Applications of Polymer)

The polymer of the invention may be used in arbitrary applications. The polymer of the invention may be used as a molded article by: being combined with another resin if required; and molding the mixture by various kinds of molding processing methods (for example, press molding, extrusion molding, injection molding, and compression molding).

The polymer of the invention may also be used as a surface modifying agent (so-called coating material) by: being combined with another resin or resin monomer if required; and dissolving or dispersing the mixture in various kinds of solvents. The phrase "used as a surface modifying agent" includes the following cases:

1) a coating film is formed by applying a solution or dispersion containing the polymer of the invention alone to a solid substance;

2) a coating film composed of a complex resin with another matrix resin is formed by applying a solution or dispersion containing the polymer of the invention and the matrix resin to a solid substance; and 3) a coating film composed of a complex resin is formed by: applying a solution or dispersion containing the polymer of the invention and the matrix resin monomer to a solid substance; and curing the matrix resin monomer.

For instance, a coating film is formed on a substrate by: applying a solution (coating solution) containing the polymer of the invention to the substrate; drying the solution; and curing the dried solution if required. The formed coating film has high non-wetting properties and low surface free energy.

The high non-wetting properties and low surface free energy are thought to be exerted because fluorine atoms on a fluorosilsesquioxane structure exist intensively on the surface of the coating film.

In the case of a surface treating agent which includes a polymer including organopolysiloxane, a coating film is formed on a substrate in the same manner as the foregoing by: applying the surface treating agent to the substrate; drying the surface treating agent; and curing the dried surface treating agent if required. The coating film to be formed expresses non-wetting properties, antifouling-properties, nonstick, releasability, sliding properties, abrasion resistance, corrosion resistance, electrical insulating properties, antireflection properties, fire retardancy, antistatic properties, chemical resistance, and weather resistance.

Those properties are thought to be expressed because organopolysiloxane existing in a molecule of the same polymer efficiently exists intensively on the surface of the coating film owing to excellent surface orientation of fluorosilsesquioxane.

As described above, the polymer of the invention may be used alone as a surface modifying agent as in the above item 1), may be used as a surface modifying agent by being mixed with another matrix resin as in the above item 2), or may be used as a surface modifying agent by being mixed with a monomer (hereinafter, also referred to as "matrix resin monomer") which forms a matrix resin as in the above item 3).

Use of the polymer of the invention as a mixture with another matrix resin as in the item 2) can modify the properties (for example, dynamic properties, surface/interface properties, and compatibility) which the resin originally has.

Examples of the matrix resin include polyethylene, polypropylene, polyvinyl chloride, polyvinylidene chloride, polystyrene, acrylonitrile-styrene resins, acrylonitrile-butadiene-styrene resins, poly(meth)acrylate resins, ultra-high molecular weight polyethylene, poly-4-methylpentene, syndiotactic polystyrene, polyamides such as Nylon 6, trade name, manufactured by Dupont, Nylon 6, 6, trade name, manufactured by Dupont, Nylon 6, 10, trade name, manufactured by Dupont, Nylon 6, T, trade name, manufactured by Dupont, and Nylon MXD 6, trade name, manufactured by Dupont, polyesters such as polyethylene terephthalate, polybutylene terephthalate, and polyethylene 2,6-naphthalenedicarboxylate, polyacetal, polycarbonate, polyphenyleneoxide, fluorine resins such as polytetrafluoroethylene and polyvinylidene fluoride; polyphenylene sulfide; polysulfone; polyethersulfone; polyetheretherketone; polyallylates such as U polymer, trade name, manufactured by UNITIKA. LTD., and Vectra, trade name, manufactured by Polyplastics Co., Ltd., polyimides such as KAPTON, trade name, manufactured by Toray Industries. Inc., and AURUM, trade name, manufactured by Mitsui Chemicals, Inc., polyetherimide, polyamide-imides, phenol resins, alkyd resins, melamine resins, epoxy resins, urea resins, bismaleimide resins, and silicone resins.

One of those resins may be used alone or a plurality of the resins may be used in combination.

Further, the polymer of the invention may be used as a mixture with a matrix resin monomer as in the item 3). In particular, use of the polymer of the invention having a crosslinking functional group as a mixture with a matrix resin monomer can allow crosslinking between a resin obtained by curing and the polymer of the invention, and thus provides a complex resin excellent in dynamic properties, surface/interface properties, and compatibility.

Specific procedures include: applying a solution including the polymer of the invention having a crosslinking functional group, a monomer for forming a matrix resin, and a curing reaction initiator (for example, acid generator) if required; and drying and curing the coating, to thereby form a coating film (complex film) composed of the complex resin with the matrix resin on the substrate.

The formed complex film has high non-wetting properties and low surface free energy. Those properties are thought to be expressed because fluorine atoms of fluorosilsesquioxane which are included in the polymer of the invention exist intensively on the surface layer of the complex film.

A preferable example of the matrix resin monomer includes a monomer for forming an epoxy resin. The epoxy resin to be formed may be any one of aliphatic epoxy resins and aromatic epoxy resins. Therefore, the matrix resin monomer may be a monomer to form any one of epoxy resins as shown in the following, for example.

Examples of the epoxy resin to be formed include epoxy resins which use as raw materials bisphenol A, bisphenol F, hydroquinone, resorcin, dihydroxynaphthalene, bis(4-hydroxyphenyl)methane, bis(4-hydroxyphenyl)dicyclopentane, 4,4'-dihydroxybenzophenone, bis(4-hydroxyphenyl) ether, bis(4-hydroxy-3-methylphenyl)ether, bis(3,5-dimethyl-4-hydroxyphenyl)ether, bis(4-hydroxyphenyl) sulfide, bis(4-hydroxy-3-methylphenyl)sulfide, bis(3,5-dimethyl-4-hydroxyphenyl)sulfide, bis(4-hydroxyphenyl) sulfone, bis(4-hydroxy-3-methylphenyl)sulfone, bis(3,5-dimethyl-4-hydroxyphenyl)sulfone, 1,1-bis(4-hydroxyphenyl)cyclohexane, 1,1-bis(4-hydroxy-3-methylphenyl)cyclohexane, 1,1-bis(3,5-dimethyl-4-hydroxyphenyl)cyclohexane, 4,4'-dihydroxybiphenyl-3-3',5,5'-tetramethylbiphenyl, bis(hydroxynaphthyl)methane, 1,1'-binaphthol, and 1,1'-bis-(3-t-butyl-6-methyl-4-hydroxyphenyl)butane.

The examples of the epoxy resin to be formed further include: phenol novolac-based epoxy resins which are a glycidyl ether compound produced by a reaction between phenols such as phenol, o-cresol, and catechol and aldehydes such as formaldehyde;

polyglycidyl ethers of trityl structure-containing polyphenols, which are obtained by condensation of phenols such as phenol, cresol, and methyl-t-butylphenol and aromatic aldehydes such as hydroxybenzaldehyde;

polyglycidyl ethers of trimethyl structure-containing polyphenol-based novolacs, which are produced by a reaction between trityl structure-containing polyphenols and formaldehydes;

polyglycidyl ethers of polyalkylphenol resins, which are produced by a reaction between phenols such as phenol, o-cresol, and catechol and xylylenedichloride or (hydroxymethyl)benzenes;

alicyclic hydrocarbon-containing polyphenol resin-type epoxy resins or polynaphthol resin-type epoxy resins, which are glycidyl ethers produced by a reaction between phenols such as phenol, o-cresol, and catechol, or naphthols such as hydroxynaphthalene and dihydroxynaphthalene, and unsaturated alicyclic hydrocarbons such as dicyclopentadiene and limonene; polyglycidyl ethers of alicyclic hydrocarbon-containing polyphenol novolac resins or polynaphtholnovolac resins, which are produced by a reaction between alicyclic hydrocarbon-containing polyphenol resins or polynaphthol resins and formaldehydes;

glycidyl ether compounds of polyhydric phenols, which are obtained by a condensation reaction between phenols and aromatic carbonyl compounds;

polyglycidyl ethers of phenols with 3 or more of phenol number having a basic structure such as phloroglycine, tris (4-hydroxyphenyl)methane, 1,1,2,2-tetrakis(4-hydroxyphenyl)ethane, 1,3-bis[(4-hydroxyphenyl)methyl]benzene, or 1,4-bis[(4-hydroxyphenyl)methyl]benzene;

glycidyl ether compounds induced from cyclic phenols such as calixarene;

amine-based epoxy resins induced from p-aminophenol, m-aminophenol, 4-aminometacresol, 6-aminometacresol, 4,4'-diaminodiphenylmethane, 3,3'-diaminodiphenylmethane, 4,4'-diaminodiphenyl ether, 3,4'-diaminodiphenyl ether, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxyphenyl)propane, p-phenylenediamine, m-phenylenediamine, 2,4-toluenediamine, 2,6-toluenediamine, p-xylylenediamine, m-xylylenediamine, 1,4-cyclohexanebis(methylamine), 1,3-cyclohexanebis(methylamine), and N,N-diglycidylaniline;

glycidylester-based compounds induced from aromatic carboxylic acids such as p-oxybenzoic acid, m-oxyoxybenzoic acid, terephthalic acid, and isophthalic acid;

hydantoin-based epoxy compounds induced from 5,5-dimethylhydantoin or the like;

alicyclic epoxy resins such as 2,2-bis(3,4-epoxycyclohexyl)propane, 2,2-bis[4-(2,3-epoxypropyl)cyclohexyl]propane, vinylcyclohexenedioxide, and 3,4-epoxycyclohexylmethyl-3,4-epoxycyclohexane carboxylate; and aliphatic epoxy resins obtained by oxidizing a double bond in unsaturated hydrocarbon compounds such as polybutadiene.

Further, the epoxy resin to be formed may be an alicyclic epoxy resin. Specific examples of the alicyclic epoxy resin include: polyglycidyl ether that is a polyhydric alcohol having at least one alicyclic ring; and an epoxy resin obtained from cyclohexaneoxide or a cyclopenteneoxide-containing compound, which is obtained by subjecting cyclohexene or a cyclopentene ring-containing compound to epoxidation with an oxidant.

Examples of the epoxy resin include hydrogenated bisphenol A diglycidyl ether, 3,4-epoxycyclohexylmethyl-3,4-epoxycyclohexane carboxylate, 3,4-epoxy-1-methylcyclohexyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-metadioxane, bis(3,4-epoxycyclohexylmethyl)adipate, vinylcyclohexenedioxide, 4-vinylepoxycyclohexane, bis(3,4-epoxy-6-methylcyclohexylmethyl)adipate, 3,4-epoxy-6-methylcyclohexyl carboxylate, methylenebis(3,4-epoxycyclohexane), dicyclopentadienediepoxide, ethylene glycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,2:8,9 diepoxylimonene (tradename: CEL3000, manufactured by DAICEL CHEMICAL INDUSTRIES, LTD.), ε-caprolactone modified bis(3,4-epoxycyclohexylmethyl) 3-cyclohexene-1,2-dicarboxylate (trade name: Epolead GT301, manufactured by DAICEL CHEMICAL INDUSTRIES, LTD.), ε-caprolactone modified tetra(3,4-epoxycyclohexylmethyl)butane tetra carboxylate (trade name: Epolead GT401, manufactured by DAICEL CHEMICAL INDUSTRIES, LTD.), condensation product of 1,2-epoxy-4(2-oxiranyl)-cyclohexane of 2,2-bis(hydroxymethyl)-1-butanol (trade name: EHPE3150, manufactured by DAICEL CHEMICAL INDUSTRIES, LTD.), mixtures of condensation product of 1,2-epoxy-4(2-oxiranyl)-cyclohexane of 2,2-bis(hydroxymethyl)-1-butanol and 3,4-epoxycyclohexenylmethyl-3,4-epoxycyclohexenecarboxylate (tradename: EHPE3150CE, manufactured by DAICEL CHEMICAL INDUSTRIES, LTD.), 3,4-epoxycyclohexylmethyl acrylate (trade name: Cyclomer A400, manufactured by DAICEL CHEMICAL INDUSTRIES, LTD.), 3,4-epoxycyclohexylmethyl methacrylate (trade name: Cyclomer M100, manufactured by DAICEL CHEMICAL INDUSTRIES, LTD.), polybutadiene Epoxydized (trade name: Epolead PB3600, manufactured by DAICEL CHEMICAL INDUSTRIES, LTD.), and an epoxidized thermoplastic elastomer (trade name: Epofriend, manufactured by DAICEL CHEMICAL INDUSTRIES, LTD.).

The examples of the epoxy resin further include: epoxy resins obtained from aliphatic polyhydric alcohols or polyglycidyl ethers of alkylene oxide adducts of the aliphatic polyhydric alcohols; epoxy resins obtained from polyglycidyl esters of aliphatic long chain poly basic acids; homopolymers synthesized by vinyl polymerization of glycidyl acrylate or glycidyl methacrylate; and copolymers synthesized by vinyl polymerization of glycidyl acrylate or glycidyl methacrylate and another vinyl monomer.

Specific examples of the polyglycidyl ether include glycidyl ethers of polyhydric alcohol such as 1,4-butanediol diglycidyl ether, 1,6-hexanediol diglycidyl ether, triglycidyl ether of glycerin, triglycidyl ether of trimethylolpropane, tetraglycidyl ether of sorbitol, hexaglycidyl ether of dipentaerythritol, diglycidyl ether of polyethylene glycol, and diglycidyl ether of polypropylene glycol.

The specific examples of the polyglycidyl ester further include: polyglycidyl ethers of polyether polyol, which are obtained by adding one or two or more kinds of alkylene oxides to aliphatic polyhydric alcohols such as propylene glycol, trimethylolpropane, and glycerin; and diglycidyl esters of an aliphatic long chain dibasic acid.

The examples of the epoxy resin further include: epoxy resins obtained from monoglycidyl ethers of aliphatic higher alcohols, phenol, cresol, butylphenol, and monoglycidyl ethers of polyether alcohols obtained by adding an alkylene oxide to them; epoxy resins obtained from glycidyl esters of higher aliphatic acids; and epoxy resins obtained from an epoxidized soybean oil, octyl epoxystearate, butyl epoxystearate, an epoxidized linseed oil, and polybutadiene Epoxydized.

The matrix resin monomer to be combined with the polymer of the invention may be a monomer for forming any one of the above-described epoxy resins, or any one of the compounds shown below.

Example of the compounds which may be used include: oxetane compounds such as trimethyleneoxide, 3,3-dimethyloxetane, and 3,3-dichloromethyloxetane; trioxanes such as tetrahydrofuran and 2,3-dimethyltetrahydrofuran; cyclic ether compounds such as 1,3-dioxolane and 1,3,6-trioxacyclooctane; cyclic lactone compounds such as β-propiolactone, γ-butyrolactone, and ε-caprolactone; thiirane compounds such as ethylene sulfide; thietane compounds such as trimethylene sulfide and 3,3-dimethyl thietane; cyclic thioether compounds such as a tetrahydrothiophene compound; spiroortho ester compounds obtained by a reaction between an epoxy compound and lactone; spiroortho carbonate compounds; cyclic carbonate compounds; vinyl ether compounds such as ethylene glycol divinyl ether, alkylvinyl ether, 3,4-dihydropyran-2-methyl(3,4-dihydropyran-2-carboxylate, and triethylene glycol divinyl ether; ethylenic unsaturated compounds such as styrene, vinylcyclohexene, isobutylene, and poly butadiene; polydimethylsiloxane having amino, hydroxyl, glycidyl, oxetanyl, and epoxycyclohexyl; polyalkyleneoxides such as polyethyleneoxide, polypropyleneoxide, a block copolymer composed of polyethyleneoxide and polypropyleneoxide; and fluorinated polyalkyleneoxides such as polyfluoroethyleneoxide and polyfluoropropyleneoxide.

As described above, the polymer of the invention having a crosslinking functional group may be used by being combined with a curing reaction initiator (for example, acid generator) in addition to a monomer for forming a matrix resin (for example, epoxy resin).

The kind of the curing reaction initiator is not limited, and may be any compound which can release a material for initiating cationic polymerization owing to active energy irradiation or thermal energy. Examples of the curing reaction initiator include carboxylic acids, amines, acid anhydride compounds, and acid generators, and preferably double salts and compounds thereof which are onium salts for releasing Lewis acids.

Examples of the curing reaction initiator include salts of cations and anions represented by the following general formula.

$$[A]^{m+}[B]^{m-}$$

In the above formula, a cation $[A]^{m+}$ is preferably an onium ion,
and represented by the following formula, for example.

$$[(\alpha)_a Q]^{m+}$$

α represents an organic group which has 1 to 60 carbon atoms and may have any atoms other than carbon atom where the number of the atoms is not limited. a represents an integer of 1 to 5. α's may each be independently same or different where the number of α is a. Further, at least one of α's is preferably an organic group having an aromatic ring.

Q represents an atom or atomic group selected from the group consisting of S, N, Se, Te, P, As, Sb, Bi, O, I, Br, Cl, F, and N=N.

Further, when the valence of Q of the cation $[A]^{m+}$ is q, m represents "a minus q", provided that N=N is assumed to have the valence of 0.

On the other hand, an anion $[B]^{m-}$ is preferably a halogenated complex, and represented by the following formula, for example.

$$[LX_b]^{m-}$$

L represents a metal or metalloid, which is a central atom of the halogenated complex, and selected from B, P, As, Sb, Fe, Sn, Bi, Al, Ca, In, Ti, Zn, Sc, V, Cr, Mn, Co, and the like. X represents a halogen atom. b represents an integer of 3 to 7.

Further, when the valence of L of the anion $[B]^{m-}$ is p, m represents "b minus p".

Specific examples of the anion $[LX_b]^{m-}$ represented by the above general formula include teterafluoroborate ($BF_4$), hexafluorophosphate ($PF_6$), hexafluoroantimonate ($SbF_6$), hexafluoroarsenate ($AsF_6$), and hexachloroantimonate ($SbCl_6$).

Further, the examples of the anion $[B]^{m-}$ to be preferably used include ones represented by the following formula. Each one of L, X, and b is the same as in the above formulae.

$$[LX_{b-1}(OH)]^{m-}$$

The examples of the anion $[B]^{m-}$ further include a perchlorate ion ($ClO_4$)$^-$, a trifluoromethyl sulfite ion ($CF_3SO_3$)$^-$, a fluorosulfonate ion ($FSO_3$)$^-$, a toluenesulfonate anion, and a trinitrobenzenesulfonate anion.

Of those onium salts, the curing reaction initiator of the invention is preferably any one of aromatic onium salts exemplified in the following items (a) to (c). One kind of those onium salts may be used alone or two or more kinds of those onium salts may be used in combination.

(a) Aryldiazonium salts such as phenyldiazonium hexafluorophosphate, 4-methoxyphenyldiazonium hexafluoroantimonate, and 4-methylphenyldiazonium hexafluorophospahate.

(b) Diaryliodinium salts such as diphenyliodium hexafluoroantimonate, di(4-methylphenyl)iodinium hexafluorophosphate, and di(4-t-butylphenyl)iodnium hexafluorophosphate.

(c) Triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio) phenylsulfide-bis-hexafluoroantimonate, 4,4'-bis (diphenylsulfonio)phenylsulfide-bis-hexafluorophosphate, 4,4'-bis[di(β-hydroxyethoxy)phenylsulfonio]phenylsulfide-bis-hexafluoroantimonate, 4,4'-bis[di(β-hydroxyethoxy) phenylsulfonio]phenylsulfide-bis-hexafluorophosphate, 4,[4'-(benzoyl)phenylthio]phenyl-di-(4-fluorophenyl) sulfonium hexafluoroantimonate, and 4,[4'-(benzoyl)phenylthio] phenyl-di-(4-fluorophenyl) sulfonium hexafluorophosphate.

Further, the curing reaction initiator of the invention may be a mixture of an iron arene complex or aluminum complex and silanols such as triphenylsilanol.

An example of the iron arene complex includes (η$^5$-2,4-cyclopentadien-1-yl)[(1,2,3,4,5,6-η)-(1-methylethyl)benzene]-iron-hexafluorophosphate. Examples of the aluminum complex include tris(acetylacetonato)aluminum, tris(ethylacetonatoacetato)aluminum, and tris(salicylaldehydato)aluminum.

Of those, in view of utility, the curing reaction initiator of the invention is preferably any one of an aromatic iodine salt, an aromatic sulfonium salt, and an iron-arene complex.

For example, in the case where the matrix resin is an epoxy resin, the content of the curing reaction initiator (preferably acid generator) is preferably 1 mol with respect to 10 to 500 mol of epoxy possessed by the polymer of the invention and the epoxy resin monomer.

As described above, the polymer of the invention may be used as a surface modifying agent by being dissolved or dispersed into a solvent. The concentration of solid contents (including the polymer of the invention, another resins, and the like) included in the surface modifying agent is not particularly limited, but may be about 1 to 50 weight %.

The kind of the solvent to be used for dissolving or dispersing the polymer of the invention is not particularly limited, but the solvent preferably contains a compound having a boiling point of about 50 to 200° C. in an amount of about 20 weight % or more. The compound having a boiling point of about 50 to 200° C. may be one kind or a combination of two or more kinds.

Examples of the compound having a boiling point of about 50 to 200° C. include: water; alcohols such as methanol, ethanol, and isopropylalcohol; ketones such as methylethylketone; aliphatic esters such as butyl acetate, butyl propionate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, methyl 3-oxypropionate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanate, and ethyl 2-oxobutanate; cyclic ethers such as dioxane; ketones such as cyclohexanone and cyclopentanone; aromatic compounds such as toluene and xylene; cyclic esters such as γ-butyrolactone; and N,N-dimethyl acetamide.

Further, the examples of the compound having a boiling point of about 50° C. to 200° C. include glycols and derivatives thereof. Examples of the glycols include ethylene glycol, diethylene glycol, triethylene glycol, propylene glycol, dipropylene glycol, tripropylene glycol, and 1,4-butanediol.

Examples of the glycol compounds include: glycol monoethers such as ethylene glycol monoisopropyl ether, ethylene glycol monobutyl ether, propylene glycol monomethyl ether, diethylene glycol monomethyl ether, diethylene glycol monoethyl ether, and diethylene glycol monobutyl ether; glycol monoether acetates such as propylene glycol monomethyl ether acetate, propylene glycol monoethyl ether acetate, propylene glycol monopropyl ether acetate, ethylene glycol monobutyl ether acetate, diethylene glycol monomethyl ether acetate, diethylene glycol monoethyl ether acetate, and diethylene glycol monobutyl ether acetate; and glycol dimethyl ethers such as diethylene glycol dimethyl ether, diethylene glycol diethyl ether, and diethylene glycol methylethyl ether.

Of those, in view of increasing coating uniformity, preferable examples of the solvent for use in the coating solution include propylene glycol monomethyl ether, propylene glycol monomethyl ether acetate, propylene glycol monoethyl ether acetate, methyl 3-methoxypropionate, ethyl 3-ethoxypropionate, diethylene glycol monoethyl ether acetate, diethylene glycol monobutyl ether acetate, diethylene glycol dimethyl ether, diethylene glycol methylethyl ether, and ethyl lactate. Further, in consideration of the safety for human body, the preferable examples of the solvent include propylene glycol monomethyl ether acetate, methyl 3-methoxypropionate, ethyl 3-ethoxypropionate, diethylene glycol methylethyl ether, and ethyl lactate.

In addition, when the coating solution is applied to a substrate or the like with a slit coater (which is preferably used to apply the solution to a large substrate) examples of the mixed solvent to be preferably used include, in view of increasing coating uniformity of the coating solution: a mixed solvent of propylene glycol monomethyl ether acetate and diethylene glycol methylethyl ether; a mixed solvent of methyl 3-methoxypropionate and diethylene glycol methylethyl ether; and a mixed solvent of propylene glycol monomethyl ether acetate, methyl 3-methoxypropionate, and diethylene glycol methylethyl ether.

Examples of methods of applying a solution containing the polymer of the invention to a substrate include, but not particularly limited to, a spin coating method, a roll coating method, a slit coating method, a dipping method, a spray coating method, a gravure coating method, a reverse coating method, a rod coating method, a bar coating method, a die coating method, a kiss coating method, a reverse kiss coating method, an air knife coating method, and a curtain coating method.

Examples of the substrate to which the solution is applied include: transparent glass substrates such as white plate glass, blue plate glass, and silica-coated blue plate glass; synthetic resin sheets, films, and substrates such as polycarbonates, polyesters, acrylic resins, vinyl chloride resins, aromatic polyamide resins, polyamideimides, and polyimides; metal substrates such as an aluminum plate, a copper plate, a nickel plate, and a stainless plate; and semiconductor substrates having a ceramic plate and a photoelectric transducer.

Those substrates may be subjected to pretreatment. Examples of the pretreatment include a chemical treatment with a silane coupling agent or the like, a sandblast treatment, a corona discharge treatment, an ultraviolet treatment, a plasma treatment, ion plating, sputtering, a gas-phase reaction method, and vacuum deposition.

The applied solution may be dried under conditions of a temperature ranging from room temperature to about 200° C.

The coating solution is produced by mixing and dissolving the polymer of the invention, and, if required, arbitrary components into the solvent.

The content of the polymer of the invention of the obtained complex resin is not particularly limited, but is preferably about 0.01 to 10 weight %. This is because the content of fluorine in the complex resin is to be adequately controlled. Further, the fluorine concentration of the complex resin is about 0.05 to 10 weight %, or preferably about 0.1 to 5 weight %.

A coating film composed of the complex resin has high non-wetting properties and low surface free energy.

Next, description is made for each of a fluorine-contained polymer composition for obtaining the coating film of the invention, a surface treating agent including the fluorine-contained polymer composition, and a coating film obtained by using the surface treating agent.

The surface treating agent of the invention can be obtained by blending a raw material composition for forming an epoxy-based resin with a coating solution which includes a copolymer of: fluorosilsesquioxane (a); organopolysiloxane (c); and, if required, an addition polymerizable monomer (b) having a crosslinking functional group in terms of fluorine atoms in an amount of about 0.01 to 5 weight % with respect to the raw material composition.

Each of an aliphatic epoxy resin and an aromatic epoxy resin may be used as the epoxy resin which is formed from a composition for forming the epoxy-based resin. Examples of the main monomer which forms the epoxy resin include bisphenol A, bisphenol F, hydroquinone, resorcin, dihydroxynaphthalene, bis(4-hydroxyphenyl)methane, bis(4-hydroxyphenyl)dicyclopentane, 4,4'-dihydroxybenzophenone, bis(4-hydroxyphenyl)ether, bis(4-hydroxy-3-methylphenyl)ether, bis(3,5-dimethyl-4-hydroxyphenyl)ether, bis(4-hydroxyphenyl)sulfide, bis(4-hydroxy-3-methylphenyl)sulfide, bis(3,5-dimethyl-4-hydroxyphenyl)sulfide, bis(4-hydroxyphenyl)sulfone, bis(4-hydroxy-3-methylphenyl)sulfone, bis(3,5-dimethyl-4-hydroxyphenyl)sulfone, 1,1-bis(4-hydroxyphenyl)cyclohexane, 1,1-bis(4-hydroxy-3-methylphenyl)cyclohexane, 1,1-bis(3,5-dimethyl-4-hydroxyphenyl)cyclohexane, 4,4'-dihydroxybiphenyl-3,3',5,5'-tetramethylbiphenyl, bis(hydroxynaphthyl)methane, 1,1'-binaphthol, and 1,1'-bis-(3-t-butyl-6-methyl-4-hydroxyphenyl)butane.

The examples of the epoxy resin to be formed further include: phenol novolac-based epoxy resins which are a glycidyl ether compound produced by a reaction between phenols such as phenol, o-cresol, and catechol and aldehydes such as formaldehyde;

polyglycidyl ethers of trityl structure-containing polyphenols, which are obtained by condensation of phenols such as phenol, cresol, and methyl-t-butylphenol and aromatic aldehydes such as hydroxybenzaldehyde;

polyglycidyl ethers of trimethyl structure-containing polyphenol-based novolacs, which are produced by a reaction between trityl structure-containing polyphenols and formaldehydes;

polyglycidyl ethers of polyalkylphenol resins, which are produced by a reaction between phenols such as phenol, o-cresol, and catechol and xylylenedichloride or (hydroxymethyl)benzenes;

alicyclic hydrocarbon containing polyphenol resin-type epoxy resins or polynaphthol resin-type epoxy resins, which are polyglycidyl ethers produced by a reaction between phenols such as phenol, o-cresol, and catechol, or naphthols such as hydroxynaphthalene and dihydroxynaphthalene, and unsaturated alicyclic hydrocarbons such as dicyclopentadiene and limonene;

polyglycidyl ethers of alicyclic hydrocarbon-containing polyphenol novolac resins or polynaphtholnovolac resins, which are produced by a reaction between alicyclic hydrocarbon-containing polyphenol resins or polynaphthol resins and formaldehydes;

glycidyl ether compounds of polyhydric phenols, which are obtained by a condensation reaction between phenols and aromatic carbonyl compounds;

polyglycidyl ethers of phenols with 3 or more of phenol number having a basic structure such as phloroglycine, tris(4-hydroxyphenyl)methane, 1,1,2,2-tetrakis(4-hydroxyphenyl)ethane, 1,3-bis[(4-hydroxyphenyl)methyl]benzene, or 1,4-bis[(4-hydroxyphenyl)methyl]benzene;

glycidyl ether compounds induced from cyclic phenols such as calixarene;

amine-based epoxy resins induced from p-aminophenol, m-aminophenol, 4-aminometacresol, 6-aminometacresol, 4,4'-diaminodiphenylmethane, 3,3'-diaminodiphenylmethane, 4,4'-diaminodiphenyl ether, 3,4'-diaminodiphenyl ether, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxyphenyl)propane, p-phenylenediamine, m-phenylenediamine, 2,4-toluenediamine, 2,6-toluenediamine, p-xylylenediamine, m-xylylenediamine, 1,4-cyclohexanebis(methylamine), 1,3-cyclohexanebis(methylamine), and N,N-diglycidylaniline;

glycidylester-based compounds induced from aromatic carboxylic acids such as p-oxybenzoic acid, m-oxyoxybenzoic acid, terephthalic acid, and isophthalic acid;

hydantoin-based epoxy compounds induced from 5,5-dimethylhydantoin or the like;

alicyclic epoxy resins such as 2,2-bis(3,4-epoxycyclohexyl)propane, 2,2-bis[4-(2,3-epoxypropyl)cyclohexyl]propane, vinylcyclohexenedioxide, and 3,4-epoxycyclohexylmethyl-3,4-epoxycyclohexane carboxylate; and aliphatic epoxy resins obtained by oxidizing a double bond in unsaturated hydrocarbon compounds such as polybutadiene.

Further, the epoxy resin to be formed may be an alicyclic epoxy resin. Specific examples of the alicyclic epoxy resin include: polyglycidyl ether that is a polyhydric alcohol having at least one alicyclic ring; and an epoxy resin obtained from cyclohexaneoxide or a cyclopenteneoxide-containing compound, which is obtained by subjecting cyclohexene or a cyclopentene ring-containing compound to epoxidation with an oxidant.

The epoxy resins can be obtained by for examples: hydrogenated bisphenol A diglycidyl ether, 3,4-epoxycyclohexylmethyl-3,4-epoxycyclohexane carboxylate, 3,4-epoxy-1-methylcyclohexyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-metadioxane, bis(3,4-epoxycyclohexylmethyl)adipate, vinylcyclohexenedioxide, 4-vinylepoxycyclohexane, bis(3,4-epoxy-6-methylcyclohexylmethyl)adipate, 3,4-epoxy-6-methylcyclohexyl carboxylate, methylenebis(3,4-epoxycyclohexane), dicyclopentadienediepoxide, ethylene glycol di(3,4-epoxycyclohexylmethyl)ether, ethylenebis(3,4-epoxycyclohexane carboxylate), dioctyl epoxyhexahydrophthalate, and di-2-ethylhexyl epoxyhexahydrophthalate.

The examples of the epoxy resin to be formed further include: epoxy resins obtained from aliphatic polyhydric alcohols or polyglycidyl ethers of alkylene oxide adducts of the aliphatic polyhydric alcohols; epoxy resins obtained from polyglycidyl esters of aliphatic long chain polybasic acids; homopolymers synthesized by vinyl polymerization of glycidyl acrylate or glycidyl methacrylate; and copolymers synthesized by vinyl polymerization of glycidyl acrylate or glycidyl methacrylate and another vinyl monomer.

Specific examples of the polyglycidyl ether include glycidyl ethers of polyhydric alcohols such as 1,4-butanediol diglycidyl ether, 1,6-hexanediol diglycidyl ether, triglycidyl ether of glycerin, triglycidyl ether of trimethylolpropane, tetraglycidyl ether of sorbitol, hexaglycidyl ether of dipentaerythritol, diglycidyl ether of polyethylene glycol, and diglycidyl ether of polypropylene glycol.

The specific examples of the polyglycidyl ester further include: polyglycidyl ethers of polyether polyol, which are obtained by adding one or two or more kinds of alkylene oxides to aliphatic polyhydric alcohols such as propylene glycol, trimethylolpropane, and glycerin; and diglycidyl esters of an aliphatic long chain dibasic acid.

The examples of the epoxy resin to be formed further include: epoxy resins obtained from monoglycidyl ethers of aliphatic higher alcohols, phenol, cresol, butylphenol, and monoglycidyl ethers of polyether alcohols obtained by adding an alkylene oxide to them; epoxy resins obtained from glycidyl esters of higher aliphatic acids; and epoxy resins obtained from an epoxidized soybean oil, octyl epoxystearate, butyl epoxystearate, an epoxidized linseed oil, and polybutadiene Epoxydized.

The blending ratio between the epoxy resin to be formed and a copolymer is not particularly limited, but excessive use of the copolymer is undesirable in view of cost efficiency. Therefore, the copolymer is preferably blended in the coating film such that the concentration thereof is about 0.01 to 5 weight % in terms of fluorine atoms, and practically about 0.01 to 3 weight % in terms of fluorine atoms.

The fluorine-contained polymer composition for obtaining the coating film of the invention and a surface treating agent including the fluorine-contained polymer composition may each include another additives such as a pigment, a dye, an antioxidant, an antidegradant, a filler, a ultraviolet absorber, and an antistatic agent and/or an electromagnetic wave shielding agent as long as the effect of the invention is not adversely affected.

Any one of the above-mentioned acid generators is preferably selected as a curing reaction initiator to be used for the surface treating agent. The content of the curing reaction initiator is preferably 1 mol with respect to 10 to 500 mol of epoxy possessed by the copolymer and the raw material composition for forming epoxy resin.

The coating solution to be used for forming the coating film of the invention is obtained by dissolving and/or dispersing the raw material composition for forming the epoxy resin and copolymer into a solvent. The kind of the solvent is not particularly limited, but the solvent preferably contains compounds each having a boiling point of about 50 to 200° C. in an amount of about 20 weight %. One kind of the compounds each having a boiling point of about 50 to 200° C. and included in the solvent may be used alone, or, two or more kinds of the compounds may be used in combination.

Examples of the compound having a boiling point of about 50° C. to 200° C. include: water; alcohols such as methanol, ethanol, and isopropylalcohol; ketones such as methylethylketone; aliphatic esters such as butyl acetate, butylpropionate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, methyl 3-oxypropionate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanate, and ethyl 2-oxobutanate; cyclic ethers such as dioxane; ketones such as cyclohexanone and cyclopentanone; aromatic compounds such as toluene and xylene; cyclic esters such as γ-butyrolactone; and N,N-dimethyl acetamide.

Further, the examples of the compounds having a boiling point of about 50° C. to 200° C. include glycols and derivatives thereof. Examples of the glycols include ethylene glycol, diethylene glycol, triethylene glycol, propylene glycol, dipropylene glycol, tripropylene glycol, and 1,4-butanediol.

Examples of the glycol compounds include: glycol monoethers such as ethylene glycol monoisopropyl ether, ethylene glycol monobutyl ether, propylene glycol monomethyl ether, diethylene glycol monomethyl ether, diethylene glycol monoethyl ether, and diethylene glycol monobutyl ether; glycol monoether acetates such as propylene glycol monomethyl ether acetate, propylene glycol monoethyl ether acetate, propylene glycol monopropyl ether acetate, ethylene glycol monobutyl ether acetate, diethylene glycol monomethyl ether acetate, diethylene glycol monoethyl ether acetate, and diethylene glycol monobutyl ether acetate; and glycol dimethyl ethers such as diethylene glycol dimethyl ether, diethylene glycol diethyl ether, and diethylene glycol methylethyl ether; hydrochlrofluorocarbon-based solvents (HCFC-141b and HCFC-225); hydrofluorocarbon (HFCs)-based solvents (HFCs having 2 to 4 carbon atoms and HFCs having 5 or 6 or more carbon atoms); perfluorocarbon-based solvents (perfluoropentene and perfluorohexane); alicyclic hydrofluorocarbon-based solvents (fluorocyclopentane and fluorocyclobutane); oxygen-containing fluorine-based solvents (fluoroether, fluoropolyether, fluoroketone, and fluoroalcohol); and aromatic-based fluorine solvents (α,α,α-trifluorotoluene and hexafluorobenzene).

As described above, a Freon-based organic solvent may be used as a solvent. However, a non-Freon-based organic solvent is preferably used in view of environmental consideration. In general, a mixed solvent composed of two or more kinds of solvents selected from the group consisting of MEK (2-butanone), CHN (cyclohexanone), MMP (methyl 3-methoxypropionate), IPA (2-propanol), is preferably used. Specific examples of the mixed solvent include a mixed solvent of MEK, MMP, and IPA, and a mixed solvent of MEK, CHN, MMP, and IPA. Each of the blending ratio of the mixed solvents may arbitrarily be adjusted appropriately, depending on the kinds of the epoxy resin and the copolymer, an improvement in leveling properties, and the like.

In view of increasing coating uniformity, each of those solvents is preferably further blended with propylene glycol monomethyl ether, propylene glycol monomethyl ether acetate, propylene glycol monoethyl ether acetate, methyl 3-methoxypropionate, ethyl 3-ethoxypropionate, diethylene glycol monoethyl ether acetate, diethylene glycol monobutyl ether acetate, diethylene glycol dimethyl ether, diethylene glycol methylethyl ether, and ethyl lactate. Further, in consideration of the safety for human body, the preferable examples of the solvent to be blended include propylene glycol monomethyl ether acetate, methyl 3-methoxypropionate, ethyl 3-ethoxypropionate, diethylene glycol methylethyl ether, and ethyl lactate.

In the invention, arbitrary components may be mixed/dissolved into the coating solution if required, in addition to the raw material composition for forming epoxy resin, copolymer, curing reaction initiator, and a solvent as long as the invention is not adversely affected. The concentration of nonvolatile components of the thus-obtained coating solution is not particularly limited, but is generally about 1 to 50 weight %, and preferably about 5 to 20 weight % in practice.

Examples of methods of applying the coating solution to the substrate include, but not particularly limited to, a spin coating method, a roll coating method, a slit coating method, a dipping method, a spray coating method, a gravure coating method, a reverse coating method, a rod coating method, a bar coating method, a die coating method, a kiss coating method, a reverse kiss coating method, an air knife coating method, and a curtain coating method.

The application amount of the releasing agent solution is set such that a thickness of the coating film after baking is generally about 0.1 to 20 μm. Note that a practical thickness of the coating film after baking is about 0.3 to 3 μm.

Baking conditions after application of the releasing agent solution are set in accordance with curing conditions of the epoxy resin and heat resistance of the substrate. The baking temperature is generally set to about 120 to 200° C., and practically about 130 to 180° C. The baking time is adjusted depending on a predetermined thickness of a coating film after baking, kind of substrate, thickness of substrate, and baking temperature. When a general plastic film is used, the baking time is set to about 15 to 120 seconds. For instance, when baking is performed under conditions where: the baking temperature is about 160° C.; a predetermined thickness of a coating film after baking is about 1 μm; and a polyethylene terephthalate film having a thickness of about 75 μm is used as a substrate, the period of time of about 45 to 60 seconds is sufficient for the baking time. When baking is performed under conditions where: a glass plate or stainless plate having a thickness of about 1 mm is used as a substrate; the baking temperature is about 160° C.; and a predetermined thickness of a coating film after baking is about 1 μm, the period of time of about 10 to 15 minutes is sufficient for the baking time. Note that examples of applications of the coating film of the invention include a peel-off coating film, a non-wetting coating film, an antifouling coating film, a sliding coating film, antireflection coating film, and an insulating coating film.

EXAMPLES

Hereinafter, the invention will be described in more detail with reference to the examples and the like, but the scope of the invention is not limited by those descriptions. Note that data of weight average molecular weight in the examples is obtained by means of GPC (gel permeation chromatography) using poly(methyl methacrylate) as a standard.

Production Example 1

Synthesis of γ-methacryloxypropylhepta(trifluoropropyl)-$T_8$-silsesquioxane

To a 1-L four-necked flask attached with a reflux condenser, a thermometer, and a dropping funnel, trifluoropropyltrimethoxysilane (100 g), THF (500 mL), deionized water (10.5 g), and sodium hydroxide (7.9 g) were charged, and the whole was heated in an oil bath from room temperature to a temperature at which THF begins to be refluxed, while the whole was stirred with a magnetic stirrer. The reaction was completed after 5 hours continuous agitation from the beginning of the reflux. After that, the flask was taken out of the oil bath and stood overnight at room temperature. Next, the flask was set in the oil bath again and the mixture was concentrated by heating and under normal pressure until a solid was deposited.

The deposited product was filtrated and collected by using a pressure filter provided with a membrane filter having a pore size of 0.5 μm. Next, the obtained solid matter was washed with THF once and dried with a vacuum dryer at 80° C. for 3 hours, to thereby obtain 74 g of a solid matter of colorless powder.

To a 1-L four-necked flask attached with a reflux condenser, a thermometer, and a dropping funnel, the obtained solid matter (65 g), dichloromethane (491 g), and triethylamine (8.1 g) were charged, and the mixture was cooled in an ice bath to 3° C. Next, γ-methacryloxypropyltrichlorosilane (21.2 g) was added to the mixture and the flask was taken out of the ice bath after the confirmation that exothermic heat was not generated, and subjected to ageing at room temperature. The aged product was washed three times with ion exchanged water and then a dichloromethane layer was dehydrated by anhydrous magnesium sulfate, followed by filtration for removing magnesium sulfate. The dehydrated product was concentrated with a rotary evaporator until a viscous solid was deposited, and then the concentrate was added with 260 g of methanol and stirred to be powder. The powder was filtrated with a filter press provided with a filter paper having a pore size of 5 μm, and dried with a vacuum dryer at 65° C. for 3 hours, to thereby obtain 41.5 g of a solid of colorless powder. GPC and $H^1$-NMR measurements revealed that the obtained product was a compound (a-1) having a structure represented by the following formula.

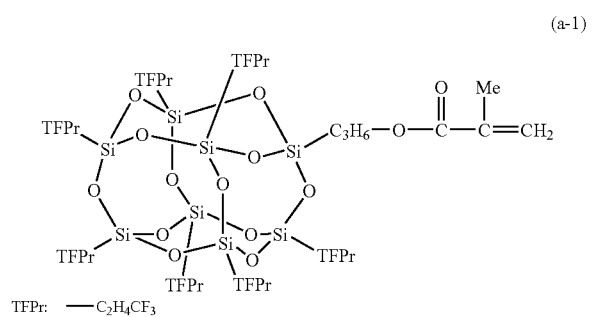

(a-1)

TFPr: —$C_2H_4CF_3$

Example 1

Synthesis of Polymer (A1)

Preparation of Polymerizable Composition

In an ampule made of heat-resistance glass, the compound (a-1), methylmethacrylate, 2,2'-azobisisobutylonitrile, and α,α,α-trifluorotoluene were introduced, and the whole was immediately cooled by using liquid nitrogen. After that, the resultant was subjected to lyophilization three times with a vacuum device provided with an oil rotary pump (pressure: 1.0 Pa), and the ampule was sealed by using a hand burner while the vacuum condition was maintained.

The molar ratio between the compound (a-1) and methylmethacrylate which were sealed in the ampule was set to (a-1):methylmethacrylate=2:98. The amount of α,α,α-trifluorotoluene was set to 30 weight % with respect to the total weight of the compound (a-1) and methylmethacrylate. The amount of 2,2'-azobisisobutylonitrile was set to 0.005 mol % with respect to the total moles of the compound (a-1) and methylmethacrylate.

Polymerization

The ampule made of heat-resistance glass thus sealed was set in a shaking bath at a constant temperature of 60° C., and polymerization was allowed to proceed for 5 hours, to thereby obtain a viscous solution. After the polymerization, the solution was added with n-heptane as a reprecipitation solvent to precipitate the polymer. The supernatant was removed from the solution and the remainder was dried under reduced pressure (80° C., 3 hours), to thereby obtain a polymer (A1). Table 2 shows the molar ratio between a structural unit derived from the compound (a-1) and a structural unit derived from methylmethacrylate of the polymer (A1), and the weight average molecular weight of the polymer (A1) determined by a GPC analysis.

Examples 2 to 6

Synthesis of Polymers (A2) to (A6)

Preparation of polymerizable composition and polymerization were performed as in the case of Example 1 except that charged monomer composition of the compound (a-1) and methylmethacrylate which were sealed in the ampule was changed as shown in the Table 1. Table 2 shows the monomer composition of a structural unit derived from the compound (a-1) and a structural unit derived from methylmethacrylate and the weight average molecular weight of each of the polymers (A2) to (A6).

Example 7

Synthesis of Polymer (A7)

Preparation of polymerizable composition and polymerization were performed as in the case of Example 1 except that the amount of methylmethacrylate sealed in the ampule was changed to 0. Table 2 shows the weight average molecular weight of the obtained polymer (A7).

Comparative Example 1

Synthesis of Polymer (B1)

Preparation of polymerizable composition and polymerization were performed as in the case of Example 1 except that the amount of the compound (a-1) sealed in the ampule was changed to 0. Table 2 shows the weight average molecular weight of the obtained polymer (B1).

TABLE 1

| | | Charged monomer composition (wt %) | |
|---|---|---|---|
| Example | Polymer | Compound (a-1) | Methylmethacrylate |
| Example 1 | A1 | 2 | 98 |
| Example 2 | A2 | 5 | 95 |
| Example 3 | A3 | 10 | 90 |
| Example 4 | A4 | 20 | 80 |
| Example 5 | A5 | 30 | 70 |
| Example 6 | A6 | 50 | 50 |
| Example 7 | A7 | 100 | 0 |
| Comparative Example 1 | B1 | 0 | 100 |

TABLE 2

| Example | Polymer | Monomer composition of polymer (wt %) | | Weight average molecular weight (Mw) | Molecular weight distribution (Mw/Mn) |
| --- | --- | --- | --- | --- | --- |
| | | Compound (a-1) | Methylmethacrylate | | |
| Example 1 | A1 | 1.9 | 98.1 | 149,300 | 1.60 |
| Example 2 | A2 | 2.9 | 97.1 | 166,300 | 1.62 |
| Example 3 | A3 | 6.9 | 93.1 | 182,800 | 1.68 |
| Example 4 | A4 | 13.0 | 87.0 | 224,800 | 1.55 |
| Example 5 | A5 | 21.1 | 78.9 | 235,200 | 1.51 |
| Example 6 | A6 | 37.1 | 62.9 | 304,700 | 1.65 |
| Example 7 | A7 | 100 | 0 | 275,200 | 1.36 |
| Comparative Example 1 | B1 | 0 | 100 | 148,700 | 1.67 |

Test Examples 1 to 7 and
Comparative Test Example 1

Preparation of Coating Film

Each of the obtained polymers (A1) to (A7) and (B1) was dissolved into 2-acetoxy-1-methoxypropane to have the concentration of 4 weight %. Each of the obtained solutions was applied onto a glass substrate (Corning Glass #1737, 0.7T) by using a spin coater (Spinner 1H-III type, manufactured by KYOEI SEMICONDUCTOR INC.) under conditions where rotations is 2,500 rpm and a rotation time is 50 seconds. The obtained substrate was dried on a hot plate at 180° C. for 30 minutes, to thereby obtain a transparent coating film.

A contact angle (degree) of each of the obtained substrates was measured by using: a FACE contact angle meter (image processing mode), CA-X type, manufactured by Kyowa Interface Science Co., Ltd,; and as a probe liquid, distilled water (for nitrogen and phosphorous measurement, available from KANTO CHEMICAL. CO. INC.) and methylene iodine (99.9%, available from SIGMA-ALDRICH Japan K.K.), to thereby calculate surface free energy (mN/m) in accordance with the theory of Kaelble-Uy (Table 3).

TABLE 3

| Test Example | Polymer | Contact angle (θ) | | Surface free energy (mN/m) |
| --- | --- | --- | --- | --- |
| | | Distilled water | Metheylene iodine | |
| Test Example 1 | A1 | 94.7 | 66.6 | 25.4 |
| Test Example 2 | A2 | 96.1 | 66.7 | 25.1 |
| Test Example 3 | A3 | 97.3 | 66.3 | 25.2 |
| Test Example 4 | A4 | 98.0 | 67.1 | 24.7 |
| Test Example 5 | A5 | 98.2 | 67.2 | 24.6 |
| Test Example 6 | A6 | 98.6 | 67.0 | 24.7 |
| Test Example 7 | A7 | 99.5 | 68.4 | 23.9 |
| Comparative Test Example 1 | B1 | 75.7 | 35.1 | 43.6 |

As shown in the Table 3, when any one of the polymers (A1) to (A7) was used, the coating film showed high non-wetting properties and a low level of the surface free energy as compared to the case where (B1) was used.

Test Examples 1-2 to 7-2

Solubility Test

Each of the obtained polymers (A1) to (A6) and (A7) was added with 2-butanone, toluene, and 2-acetoxy-1-methoxypropane to prepare a solution having the polymer in the concentration of 10 weight %. The solubility of each of the polymers (A1) to (A6) and (A7) in each of 2-butanone, toluene, and 2-acetoxy-1-methoxypropane was evaluated by visual observation in accordance with the following evaluation criteria (Table 4).

+++: The polymer is easily dissolved and the color of the solution of the polymer shows colorless and clear.

++: The polymer is dissolved and the color of the solution of the polymer shows pale white.

+: An insoluble matter of the polymer is observed.

(Processability Test)

(Preparation of Coating Film)

Each of the obtained polymers (A1) to (A6) and (A7) was dissolved into 2-butanone to obtain the coating solution having the polymer in the concentration of 5 weight %. Each of the obtained coating solutions was applied onto a polyethylene terephthalate film (thickness: 188 μm, brand name: Lumirror 188-T60, manufactured by Toray Industries, Inc.) by using a coating rod (#4, manufactured by R.D. Specialties). A wet thickness at the use of the coating rod (#4) was 9 μm. The obtained coating was cured/dried in a high-temperature chamber at 150° C. for 60 seconds, to thereby obtain a coating film having a thickness of about 0.45 μm. The thickness was calculated from the wet thickness at the use of the coating rod (#4) and a resin solid content in the coating solution.

Thickness (μm)=(wet thickness at use of coating rod)×(resin solid content in weight % in coating solution)/100

The processability of each of the obtained coating films was evaluated by visual observation in accordance with the following evaluation criteria (Table 4).

+++: The color of the whole coating shows clear.

++: Cissing and mottling are observed in some parts of the coating film.

+: Cissing and mottling are observed in the whole coating film.

(Test of Adhesiveness to Substrate)

A piece of an acrylic adhesive tape (NITTO DENKO CORPORATION, No. 31B) was stuck to the surface of each of the obtained coating films, and the whole was subjected to contact bonding with a 2-kg weight pressure roller. After that, the acrylic tape was peeled. The surface of the obtained coating film after the acrylic tape was peeled was observed to evaluate adhesiveness to substrate. The adhesiveness to substrate of each of the obtained coating films was evaluated by visual observation in accordance with the following evaluation criteria (Table 4).

+++: No trace of a tape is observed.
+: A trace of a tape is observed.

A contact angle (degree) of each of the obtained coating films was measured by using: a FACE contact angle meter (image processing mode), CA-X type, manufactured by Kyowa Interface Science Co., Ltd,; and as a probe liquid, distilled water (for nitrogen and phosphorous measurement, available from KANTO CHEMICAL. CO. INC.) and methylene iodine (99.9%, available from SIGMA-ALDRICH Japan K.K.), to thereby calculate surface free energy (mN/m) in accordance with the theory of Kaelble-Uy (Table 4).

methacrylate (1.1 g), and α,α,α-trifluorotoluene (69.7 g) were charged, and the flask was sealed with argon. At the same time, argon was blown into the flask with the syringe to perform deoxidation.

After sufficient deoxidation, 2,2-azobisisobutylonitrile (0.2565 g) and mercaptoacetic acid (0.0288 g) were charged into the flask, and the flask was set in an oil bath at 60° C. to perform polymerization. After 8-hour polymerization, the resultant polymer composition was poured into 2 L of n-heptane to deposit the polymer. The supernatant was removed

TABLE 4

| Test Example | Polymer | Solubility | | | Process ability | Test of adhesiveness | Adhesiveness to substrate Surface free energy (mN/m) | |
|---|---|---|---|---|---|---|---|---|
| | | 2-Butanone | Toluene | 2-Acetoxy-1-methoxypropane | | | Before test of adhesiveness | After test of adhesiveness |
| Test Example 1-2 | A1 | +++ | +++ | +++ | +++ | +++ | 26.1 | 26.8 |
| Test Example 2-2 | A2 | +++ | +++ | +++ | +++ | +++ | 26.0 | 26.9 |
| Test Example 3-2 | A3 | +++ | +++ | +++ | +++ | +++ | 26.2 | 27.0 |
| Test Example 4-2 | A4 | +++ | ++ | +++ | +++ | +++ | 26.2 | 26.9 |
| Test Example 5-2 | A5 | +++ | + | +++ | +++ | +++ | 26.2 | 27.3 |
| Test Example 6-2 | A6 | +++ | + | ++ | ++ | +++ | 26.2 | 28.8 |
| Test Example 7-2 | A7 | +++ | + | + | + | + | 26.1 | 49.1 |

The above results show that each of the solubility and processability tended to decrease as the content of fluorosilsesquioxane increased at production of the polymer, and the homopolymer caused an undesirable result. Regarding the adhesiveness to substrate, in the case of the homopolymer, the coating film was peeled off the substrate after the test of adhesiveness, resulting in an increase in the surface free energy after the test of adhesiveness. Further, a copolymer including a homopolymer of fluorosilsesquioxane and fluorosilsesquioxane resulted in the surface free energy similar to that of the homopolymer. In consideration of the above results, it was clarified that the copolymer including fluorosilsesquioxane has non-wetting properties similar to that of the homopolymer and further has high solubility, processability, and adhesiveness to substrate.

Example 8

Synthesis of Polymer (A8)

To a 200-mL four-necked flask attached with a reflux condenser, a thermometer, a dropping funnel, and a septum cap provided with a syringe for argon bubbling, the compound (a-1) (15.3 g), methylmethacrylate (13.6 g), glycidyl-from the n-heptane mixture and the remainder was dried under reduced pressure (80° C., 3 hours), to thereby obtain 26.2 g of a polymer (A8).

The weight average molecular weight and Mw/Mn of the polymer (A8), which were determined by a GPC analysis, were 91,900 and 1.62, respectively. Further, the composition (molar ratio) of monomer component of the polymer (A8) determined by an $H^1$-NMR measurement was expressed as the following: compound (a-1):methylmethacrylate:glycidylmethacrylate=7.1:88.0:4.9. Further, the fluorine concentration of the polymer (A8) determined by the $H^1$-NMR measurement was 15.57 weight %.

Comparative Example 2

Synthesis of Polymer (B2)

To a 100-mL four-necked flask attached with a reflux condenser, a thermometer, a dropping funnel, and a septum cap provided with a syringe for argon bubbling, 2,2,2-trifluoroethylmethacrylate (10.1 g), methylmethacrylate (4.2 g), glycidylmethacrylate (0.8 g), and α,α,α-trifluorotoluene (34.8 g) were charged, and the flask was sealed with argon. At the same time, argon was blown into the flask with the syringe to perform deoxidation.

After sufficient deoxidation, 2,2-azobisisobutylonitrile (0.1756 g) and mercaptoacetic acid (0.0197 g) were charged into the flask, and the flask was set in an oil bath at 60° C. to perform polymerization. After 8-hour polymerization, the resultant polymer composition was poured into 1 L of n-heptane to deposit the polymer. The supernatant was removed from the n-heptane mixture and the remainder was dried under reduced pressure (80° C., 3 hours), to thereby obtain 8.2 g of a polymer (B2).

The weight average molecular weight and Mw/Mn of the polymer (B2), which were determined by a GPC analysis, were 65,100 and 1.76, respectively. Further, the composition (molar ratio) of monomer component of the polymer (B2) determined by an $H^1$-NMR measurement was expressed as the following: 2,2,2-trifluoroethylmethacrylate:methylmethacrylate:glycidylmethacrylate=58.1:36.9:5.0. Further, the fluorine concentration of the polymer (B2) determined by the $H^1$-NMR measurement, was 23.37 weight %.

Test Example 8

Preparation of Coating Film

Each of the polymer (A8) (0.05 g) and neopentylglycol diglycidyl ether (4.95 g) was dissolved into 2-butanone (45 g). Further, the mixture was added with San-Aid SI-60 (manufactured by SANSHIN CHEMICAL INDUSTRY CO., LTD.) (0.2391 g) as a curing agent (epoxy group/San-Aid SI-60=99/1 (in molar ratio), epoxy amount: 45.79 mmol), to thereby obtain a coating agent.

The fluorine concentration of a resin solid content of the obtained coating agent was 0.16 weight %. The term "fluorine concentration of a resin solid content" means the ratio of fluorine weight included in the polymer (A8) with respect to the total weight of the polymer (A8) and neopentylglycol diglycidyl ether, and was calculated from the weight ratio between the polymer (A8) and neopentylglycol diglycidyl ether.

The obtained coating solution was applied onto a glass substrate (Corning Glass #1737, 0.7T) by using a spin coater (Spinner 1H-III type, manufactured by KYOEI SEMICONDUCTOR INC.) under conditions where rotations is 2,500 rpm and a rotation time is 50 seconds. The obtained coating was cured/dried in a high-temperature chamber at 150° C. for 1 minute, to thereby obtain a clear coating film.

A contact angle of the obtained coating film was measured by using, as a probe liquid, distilled water (for nitrogen and phosphorous measurement, available from KANTO CHEMICAL. CO. INC.) and methylene iodine (99%, available from SIGMA-ALDRICH Japan K.K.), to thereby calculate surface free energy in accordance with the theory of Kaelble-Uy (Table 5).

Test Example 9

Preparation of Coating Film

Each of the polymer (A8) (0.25 g) and neopentylglycol diglycidyl ether (4.75 g) was dissolved into 2-butanone (45 g). Further, the mixture was added with San-Aid SI-60 (manufactured by SANSHIN CHEMICAL INDUSTRY CO., LTD.) (0.2297 g) as a curing agent (epoxy group/San-Aid SI-60=99/1 (in molar ratio), epoxy amount: 44.00 mmol), to thereby obtain a coating agent.

The fluorine concentration of a resin solid content of the obtained coating agent was 0.78 weight %.

A coating film was prepared by using the obtained coating solution as in the same manner as Example 8, to thereby calculate a contact angle and surface free energy of the obtained coating film (Table 5).

Test Example 10

Preparation of Coating Film

Each of the polymer (A8) (0.50 g) and neopentylglycol diglycidyl ether (4.50 g) was dissolved into 2-butanone (45 g). Further, the mixture was added with San-Aid SI-60 (manufactured by SANSHIN CHEMICAL INDUSTRY CO., LTD.) (0.2180 g) as a curing agent (epoxy group/San-Aid SI-60=99/1 (in molar ratio), epoxy amount: 41.74 mmol), to thereby obtain a coating agent.

The fluorine concentration of a resin solid content of the obtained coating agent was 1.56 weight %.

A coating film was prepared by using the obtained coating solution as in the same manner as Example 8, to thereby calculate a contact angle and surface free energy of the obtained coating film (Table 5).

Test Example 11

Preparation of Coating Film

Each of the polymer (A8) (1.00 g) and neopentylglycol diglycidyl ether (4.00 g) was dissolved into 2-butanone (45 g). Further, the mixture was added with San-Aid SI-60 (manufactured by SANSHIN CHEMICAL INDUSTRY CO., LTD.) (0.1946 g) as a curing agent (epoxy group/San-Aid SI-60=99/1 (in molar ratio), epoxy amount: 37.26 mmol), to thereby obtain a coating agent.

The fluorine concentration of a resin solid content of the obtained coating agent was 3.11 weight %.

A coating film was prepared by using the obtained coating solution as in the same manner as Example 8, to thereby calculate a contact angle and surface free energy of the obtained coating film (Table 5).

Test Example 12

Preparation of Coating Film

Each of the polymer (A8) (1.50 g) and neopentylglycol diglycidyl ether (3.50 g) was dissolved into 2-butanone (45 g). Further, the mixture was added with San-Aid SI-60 (manufactured by SANSHIN CHEMICAL INDUSTRY CO., LTD.) (0.1711 g) as a curing agent (epoxy group/San-Aid SI-60=99/1 (in molar ratio), epoxy amount: 32.77 mmol), to thereby obtain a coating agent.

The fluorine concentration of a resin solid content of the obtained coating agent was 4.67 weight %.

A coating film was prepared by using the obtained coating solution as in the same manner as Example 8, to thereby calculate a contact angle and surface free energy of the obtained coating film (Table 5).

Comparative Test Example 2

Each of the polymer (B2) (0.05 g) and neopentylglycol diglycidyl ether (4.95 g) was dissolved into 2-butanone (45 g). Further, the mixture was added with San-Aid SI-60 (manufactured by SANSHIN CHEMICAL INDUSTRY CO., LTD.) (0.2391 g) as a curing agent (epoxy group/San-Aid SI-60=99/1 (in molar ratio), epoxy amount: 45.80 mmol), to thereby obtain a coating agent.

The fluorine concentration of a resin solid content of the obtained coating agent was 0.23 weight %.

A coating film was prepared by using the obtained coating solution as in the same manner as Example 8, to thereby calculate a contact angle and surface free energy of the obtained coating film (Table 5).

Comparative Test Example 3

Each of the polymer (B2) (0.25 g) and neopentylglycol diglycidyl ether (4.75 g) was dissolved into 2-butanone (45 g). Further, the mixture was added with San-Aid SI-60 (manufactured by SANSHIN CHEMICAL INDUSTRY CO., LTD.) (0.2299 g) as a curing agent (epoxy group/San-Aid SI-60=99/1 (in molar ratio), epoxy amount: 44.02 mmol), to thereby obtain a coating agent.

The fluorine concentration of a resin solid content of the obtained coating agent was 1.17 weight %.

A coating film was prepared by using the obtained coating solution as in the same manner as Example 8, to thereby calculate a contact angle and surface free energy of the obtained coating film (Table 5).

Comparative Test Example 4

Each of the polymer (B2) (0.50 g) and neopentylglycol diglycidyl ether (4.50 g) was dissolved into 2-butanone (45 g). Further, the mixture was added with San-Aid SI-60 (manufactured by SANSHIN CHEMICAL INDUSTRY CO., LTD.) (0.2182 g) as a curing agent (epoxy group/San-Aid SI-60=99/1 (in molar ratio), epoxy amount: 41.79 mmol), to thereby obtain a coating agent.

The fluorine concentration of a resin solid content of the obtained coating agent was 2.34 weight %.

A coating film was prepared by using the obtained coating solution as in the same manner as Example 8, to thereby calculate a contact angle and surface free energy of the obtained coating film (Table 5).

Comparative Test Example 5

Each of the polymer (B2) (1.00 g) and neopentylglycol diglycidyl ether (4.00 g) was dissolved into 2-butanone (45 g). Further, the mixture was added with San-Aid SI-60 (manufactured by SANSHIN CHEMICAL INDUSTRY CO., LTD.) (0.1950 g) as a curing agent (epoxy group/San-Aid SI-60=99/1 (in molar ratio), epoxy amount: 37.34 mmol), to thereby obtain a coating agent.

The fluorine concentration of a resin solid content of the obtained coating agent was 4.67 weight %.

A coating film was prepared by using the obtained coating solution as in the same manner as Example 8, to thereby calculate a contact angle and surface free energy of the obtained coating film (Table 5).

Comparative Test Example 6

Each of the polymer (B2) (1.50 g) and neopentylglycol diglycidyl ether (3.50 g) was dissolved into 2-butanone (45 g). Further, the mixture was added with San-Aid SI-60 (manufactured by SANSHIN CHEMICAL INDUSTRY CO., LTD.) (0.1718 g) as a curing agent (epoxy group/San-Aid SI-60=99/1 (in molar ratio), epoxy amount: 32.90 mmol), to thereby obtain a coating agent.

The fluorine concentration of a resin solid content of the obtained coating agent was 7.01 weight %.

A coating film was prepared by using the obtained coating solution as in the same manner as Example 8, to thereby calculate a contact angle and surface free energy of the obtained coating film (Table 5).

Comparative Test Example 7

Neopentylglycol diglycidyl ether (5.00 g) was dissolved into 2-butanone (45 g). Further, the mixture was added with San-Aid SI-60 (manufactured by SANSHIN CHEMICAL INDUSTRY CO., LTD.) (0.2173 g) as a curing agent (epoxy group/San-Aid SI-60=99/1 (in molar ratio), epoxy amount: 46.00 mmol), to thereby obtain a coating agent.

A coating film was prepared by using the obtained coating solution as in the same manner as Example 8, to thereby calculate a contact angle and surface free energy of the obtained coating film (Table 5).

TABLE 5

| Test Example | Fluorine concentration of resin solid content (wt %) | Contact angle ($\theta$) Distilled water | Contact angle ($\theta$) Methylene iodine | Surface free energy (mN/m) |
| --- | --- | --- | --- | --- |
| Test Example 8 | 0.16 | 94.8 | 66.3 | 25.5 |
| Test Example 9 | 0.78 | 93.9 | 66.9 | 25.4 |
| Test Example 10 | 1.56 | 93.1 | 67.1 | 25.4 |
| Test Example 11 | 3.11 | 94.7 | 66.6 | 25.4 |
| Test Example 12 | 4.67 | 93.5 | 66.4 | 25.7 |
| Comparative Test Example 2 | 0.23 | 88.7 | 65.1 | 27.3 |
| Comparative Test Example 3 | 1.17 | 88.2 | 65.5 | 27.3 |
| Comparative Test Example 4 | 2.34 | 88.2 | 65.4 | 27.3 |
| Comparative Test Example 5 | 4.67 | 88.7 | 65.4 | 27.2 |
| Comparative Test Example 6 | 7.01 | 89.7 | 65.1 | 27.1 |
| Comparative Test Example 7 | 0 | 71.0 | 37.6 | 44.1 |

As shown in the Table 5, it is found that any one of the coating films obtained in Test Examples 8 to 12 and Comparative Test Examples 2 to 6 has high non-wetting properties and a low level of the surface free energy as compared to the case where the fluorine concentration was 0 (Comparative Test Examples 7). Those properties are attributed to effects of fluorine atoms included in a cured resin for forming the coating film.

Further, it is found that anyone of the coating films obtained in Test Examples 8 to 12 has high non-wetting properties, particularly high water repellency as compared to Comparative Test Examples 2 to 6, though the fluorine concentration of the cured resin for forming the film of each of Test Examples 8 to 12 is similar to those in Comparative Test Examples 2 to 6. It is also found that any one of the coating films obtained in Test Examples 8 to 12 has low surface free energy. These properties are thought to be attributed to effects of fluorosilsesquioxane included in the cured resin.

Example 9

Synthesis of Polymer (A9)

(Polymerization)

To a 5-L four-necked flask attached with a reflux condenser, a thermometer, a dropping funnel, and a septum cap provided with a syringe for argon bubbling, 760.68 g of the compound (a-1), 60.77 g of glycidylmethacrylate (GMA), 55.13 g of 3-ethyl-3-oxetanylmethylmethacrylate (OXE-30), 25.16 g of 3,4-epoxycyclohexylmethylmethacrylate (M100), 498.26 g of methacrylic mono terminated polydimethylsiloxane (FM0721, molecular weight: about 6,300), and 1394.31 g of 2-butanone (MEK) were introduced, and the flask was sealed with nitrogen. The flask was set in an oil bath at 95° C. to reflux the mixture therein and perform deoxidation for 10 minutes. Next, a solution obtained by dissolving each of 3.6469 g of 2,2-azobisisobutylonitrile (AIBN) and 2.0459 g of mercaptoacetic acid (AcSH) in 51.24 g of MEK was introduced into the flask to start polymerization while the reflux temperature was maintained. After 3-hour polymerization, a solution obtained by dissolving 3.6459 g of AIBN in 32.82 g of MEK was introduced into the flask to continue the polymerization for additional 2 hours. After the polymerization, the resultant polymerization composition was added with 1.4 L of modified alcohol (SOLMIX AP-1, manufactured by Nippon alcohol hanbai Inc.), and the whole was poured into 28 L of SOLMIX AP-1 to deposit the polymer. The supernatant was removed from the SOLMIX AP-1 mixture and the remainder was dried under reduced pressure (80° C., 5 hours), to thereby obtain 1,035 g of a polymer (A9). The weight average molecular weight and the molecular weight distribution of the obtained polymer, which were determined by a GPC analysis, were 39,000 and 1.50, respectively. Further, the composition (molar ratio) of monomer component of the polymer (A9), which was determined by an $H^1$-NMR measurement, was expressed as the following: compound (a-1): GMA:OXE-30:M100:FM0721=40.8:25.2:19.2:9.0:5.8. Further, the fluorine concentration of the polymer (A9), which was determined by the $H^1$-NMR measurement, was 17.05 weight %.

Comparative Example 3

Synthesis of Polymer (B3)

(Polymerization)

To a 50-mL four-necked flask attached with a reflux condenser, a thermometer, a dropping funnel, and a septum cap provided with a syringe for argon bubbling, 4.53 g of 2-(perfluorobutyl)ethylmethacrylate (M-1420), 1.33 g of GMA, 1.21 g of OXE-30, 0.55 g of M100, 4.27 g of FM0721, 0.10 g of methylmethacrylate (MMA), and 17.93 g of MEK were introduced, and the flask was sealed with argon. The flask was set in an oil bath at 95° C. to reflux the mixture therein and perform deoxidation for 10 minutes. Next, a solution obtained by dissolving each of 0.0441 g of AIBN and 0.0247 g of ACSH in 0.6195 g of MEK was introduced into the flask to start polymerization while the reflux temperature was maintained. After 3-hour polymerization, a solution obtained by dissolving 0.0441 g of AIBN in 0.3968 g of MEK was introduced into the flask to continue the polymerization for additional 2 hours. After the polymerization, the resultant polymerization composition was added with 15 mL of Solmix AP-1, and the whole was poured into 300 mL of Solmix AP-1 to deposit the polymer. The supernatant was removed from the Solmix AP-1 mixture and the remainder was dried under reduced pressure (80° C., 3 hours), to thereby obtain 6.8 g of a polymer (B1). The weight average molecular weight and the molecular weight distribution of the obtained polymer, which were determined by a GPC analysis, were 53,500 and 1.70, respectively. Further, the composition (molar ratio) of monomer component of the polymer (B3), which was determined by an $H^1$-NMR measurement, was expressed as the following: M-1420:GMA:OXE-30:M100:FM0721:MMA=42.5:27.0:18.5:7.8:2.2:2.0. Further, the fluorine concentration of the polymer (B3), which was determined by the $H^1$-NMR measurement, was 19.67 weight %.

Example 13

Preparation of Coating Film

Each of 0.24 g of the obtained polymer (A9) and 3.76 g of 3,4-epoxycyclohexenylmethyl-3,4-epoxycyclohexenecarboxylate (Celloxide2021, epoxy equivalent: 131 g/mol, manufactured by DICEL CHEMICAL INDUSTRIES, LTD.) was dissolved into 36.0 g of a mixed solvent (2-butanone/cyclohexanone/2-propanol/methyl 3-methoxypropionate=50/20/15/15 in weight ratio). Further, 0.065 g of a cationic polymerization initiator (epoxy group/cationic polymerization initiator=228/1 (in molar ratio), epoxy amount: 28.7 mmol) as a curing agent was added to the mixture, to thereby obtain a coating agent.

The fluorine concentration of a resin solid content of the obtained coating agent was 1.04 weight %, and the silicone concentration of the resin solid content was 2.33 weight %. The terms "fluorine concentration of a resin solid content" and "silicone concentration of the resin solid content" mean the ratio of each of fluorine and silicone weights included in the polymer (A9) with respect to the total weight of the polymer (A9) and Celloxide2021, respectively, and were each calculated from the weight ratio between the polymer (A9) and Celloxide2021.

The obtained coating solution was applied onto a polyethylene terephthalate film (thickness: 75 μm, brand name: Lumirror T60, manufactured by Toray Industries, Inc.) by using a coating rod (#4, manufactured by R.D. Specialties). The obtained coating was cured/dried in a high-temperature chamber at 150° C. for 30 seconds, to thereby obtain a clear coating film having a thickness of about 0.9 μm.

Example 14

Preparation of Coating Film

Each of 0.24 g of the obtained polymer (A9) and 3.76 g of neopentylglycol diglycidyl ether (SR-NPG, epoxy equivalent: 145 g/mol, manufactured by Sakamoto Yakuhin Kogyo Co., Ltd.) was dissolved into 36.0 g of a mixed solvent (2-butanone/2-propanol=70/30 in weight ratio). Further, 0.135 g of a cationic polymerization initiator (epoxy group/cationic polymerization initiator=100/1 (in molar ratio), epoxy amount: 25.9 mmol) as a curing agent was added to the mixture, to thereby obtain a coating agent.

The fluorine concentration of a resin solid content of the obtained coating agent was 1.04 weight %, and the silicone concentration of the resin solid content was 2.33 weight %. The terms "fluorine concentration of a resin solid content" and "silicone concentration of the resin solid content" mean the ratio of each of fluorine and silicone weights included in the polymer (A9) with respect to the total weight of the polymer (A9) and SR-NPG, respectively, and were each calculated from the weight ratio between the polymer (A9) and SR-NPG.

The obtained coating solution was applied onto a polyethylene terephthalate film (thickness: 75 μm, brand name: Lumirror T60, manufactured by Toray Industries, Inc.) by using a coating rod (#4, manufactured by R.D. Specialties). The obtained coating was cured/dried in a high-temperature chamber at 150° C. for 30 seconds, to thereby obtain a clear coating film having a thickness of about 0.9 μm.

Comparative Test Example 8

Preparation of Coating Film

Each of 0.24 g of the obtained polymer (B3) and 3.76 g of 3,4-epoxycyclohexenylmethyl-3,4-epoxycyclohexenecarboxylate (Celloxide2021, epoxy equivalent: 131 g/mol, manufactured by DICEL CHEMICAL INDUSTRIES, LTD.) was dissolved into 36.0 g of a mixed solvent (2-butanone/cyclohexanone/2-propanol/methyl 3-methoxypropionate=50/20/15/15 in weight ratio). Further, 0.065 g of a cationic polymerization initiator (epoxy group/cationic polymerization initiator=228/1 (in molar ratio), epoxy amount: 28.7 mmol) as a curing agent was added to the mixture, to thereby obtain a coating agent. The fluorine concentration of a resin solid content of the obtained coating agent was 1.22 weight %, and the silicone concentration of the resin solid content was 2.33 weight %.

The obtained coating solution was applied onto a polyethylene terephthalate film (thickness: 75 μm, brand name: Lumirror T60, manufactured by Toray Industries, Inc.) by using a coating rod (#4, manufactured by R.D. Specialties). The obtained coating was cured/dried in a high-temperature chamber at 150° C. for 30 seconds, to thereby obtain a clear coating film having a thickness of about 0.9 μm.

Comparative Test Example 9

Preparation of Coating Film

Each of 0.24 g of the obtained polymer (B3) and 3.76 g of neopentylglycol diglycidyl ether (SR-NPG, epoxy equivalent: 145 g/mol, manufactured by Sakamoto Yakuhin Kogyo Co., Ltd.) was dissolved into 36.0 g of a mixed solvent (2-butanone/2-propanol=70/30 in weight ratio). Further, 0.135 g of a cationic polymerization initiator (epoxy group/cationic polymerization initiator=100/1 (in molar ratio), epoxy amount: 25.9 mmol) as a curing agent was added to the mixture, to thereby obtain a coating agent.

The fluorine concentration of a resin solid content of the obtained coating agent was 1.22 weight %, and the silicone concentration of the resin solid content was 2.33 weight %.

The obtained coating solution was applied onto a polyethylene terephthalate film (thickness: 75 μm, brand name: Lumirror T60, manufactured by Toray Industries, Inc.) by using a coating rod (#4, manufactured by R.D. Specialties). The obtained coating was cured/dried in a high-temperature chamber at 150° C. for 30 seconds, to thereby obtain a clear coating film having a thickness of about 0.9 μm.

Test Example 15

The physical property values of each of the coating films obtained in the (Test Example 13), (Test Example 14), (Comparative Test Example 8), and (Comparative Test Example 9) of the invention were measured by the following methods.

1) Peel Force Test

A piece of an acrylic adhesive tape (NITTO DENKO CORPORATION No. 31B) and a piece of a silicone-based adhesive tape (TERAOKA CORPORATION No. 640S) were stuck on the surface of a peel off layer of the film, and the whole was subjected to contact bonding with a 2-kg weight pressure roller. Peel force between the peel off layer and the adhesive layer 24 hours after the contact bonding was measured with a tensile testing machine.

2) Peel Force Test (Heat Resistance)

A piece of an acrylic adhesive tape (NITTO DENKO CORPORATION No. 31B) and a piece of a silicone-based adhesive tape (TERAOKA CORPORATION No. 640S) were stuck on the surface of a peel off layer of the film, and the whole was subjected to contact bonding with a 2-kg weight pressure roller and then left stood at room temperature for 30 minutes. Next, the pressed product was subjected to thermal history in a high-temperature chamber at 130° C. for 1 hour and then stood to be cooled for 30 minutes. After that, peel force between the peel off layer and the adhesive layer was measured with a tensile testing machine.

3) Residual Adhesive Measurement

A piece of an acrylic adhesive tape (NITTO DENKO CORPORATION No. 31B, tape width: 25 mm) was stuck on a plate made of Teflon (trade name, 100 mm length, 100 mm width, and 2 mm thickness), and the whole was subjected to contact bonding by being pressurized back and forth once with a 2-kg weight pressure roller. After that, an SUS plate (material: SUS 304, 100 mm length, 100 mm width, and 1 mm thickness) was placed on the tape which had been subjected to contact bonding, and a 2-kg weight was further placed thereon to give the tape a load of 20 g per 1 cm². Next, the pressed product was subjected to thermal history in a high-temperature chamber at 70° C. for 20 hours, stood to be cooled for 30 minutes, and given the load. After that, the piece of an acrylic adhesive tape (NITTO DENKO CORPORATION No. 31B) which had been subjected to thermal history was stuck on the SUS plate (SUS 304) again, and the whole was subjected to contact bonding by being pressurized back and forth once with a 2-kg weight pressure roller. Peel force 30 minutes after the contact bonding was referred to as "basic adhesion ($f_0$)". The piece of an acrylic adhesive tape was stuck on the surface of the peel off layer of the film, and the whole was subjected to contact bonding by being pressurized back and forth once with a 2-kg weight pressure roller. After that, an SUS plate (material: SUS 304, 100 mm length, 100 mm width, and 1 mm thickness) was placed on the tape which had been subjected to contact bonding, and a 2-kg weight was further placed thereon to give the tape a load of 20 g per 1 cm². Next, the pressed product was subjected to thermal history in a high-temperature chamber at 70° C. for 20 hours, stood to be cooled for 30 minutes, and given the load. After that, the piece of an acrylic adhesive tape (NITTO DENKO CORPORATION No. 31B, tape width: 25 mm) which had been subjected to thermal history was stuck on the SUS plate (SUS 304) again, and the whole was subjected to contact bonding by being pressurized back and forth once with a 2-kg weight pressure roller. Peel force 30 minutes after the contact bonding was referred to as "residual adhesive (f)". The residual adhesive was determined from the obtained basic adhesion and residual adhesive by using the following formula.

$$\text{Residual adherence rate (\%)}=(f/f_0)\times 100$$

4) Contact Angle and Surface Free Energy Measurements

A contact angle of each of the coating films was measured by using, as a probe liquid, distilled water (for nitrogen and phosphorous measurement, available from KANTO CHEMICAL. CO. INC.) and methylene iodine (99%, available from SIGMA-ALDRICH Japan K.K.), to thereby calculate surface free energy in accordance with the theory of Kaelble-Uy.

Table 6 shows the physical property values of the obtained coating films.

5) Rub-Off Test

The each of the coating films was rubbed by finger-tip 10 times to evaluate the presence or absence of fall-out of the coating.

6) Solvent Resistance

A cotton wool impregnated with 2-propanol was reciprocated on the each of the coating films 10 times to evaluate the presence or absence of fall-out of the coating.

silicone content similar to that of Comparative Test Example 8 and a low fluorine concentration.

A comparison between Test Example 14 and Comparative Test Example 9 also revealed that the coating including a fluorosilsesquioxane compound of Test Examples 14 has more excellent releasability, in particular, expresses significantly excellent releasability against an acrylic adhesive tape after heating, and against a silicone-based adhesive tape at room temperature and after heating, though the coating including a fluorosilsesquioxane compound of Test Examples 14 has the silicone content similar to that of Comparative Test Example 9 and a low fluorine concentration.

Consequently, the use of the fluorosilsesquioxane compound is found to be more effective to strengthen the releasability of organopolysiloxane than the use of conventional

TABLE 6

| | | Test Example 13 | Test Example 14 | Comparative Test Example 8 | Comparative Test Example 9 |
|---|---|---|---|---|---|
| | Constitution of coating solution | | | | |
| Formulation of coating agent | Copolymer (A9) | 0.24 | 0.24 | — | — |
| | Copolymer (B3) | — | — | 0.24 | 0.24 |
| | Celloxide 2021 | 3.76 | — | 3.76 | — |
| | SR-NPG | — | 3.76 | — | 3.76 |
| | Mixed solvent weight | 36.0 | 36.0 | 36.0 | 36.0 |
| | Mixed solvent composition (wt %) | | | | |
| | 2-Butanone | 50 | 70 | 50 | 70 |
| | Cycylohexanone | 20 | — | 20 | — |
| | 2-Propanol | 15 | 30 | 15 | 30 |
| | Methyl 3-methoxypropionate | 15 | — | 15 | — |
| | Cationic polymerization initiator | 0.065 | 0.135 | 0.065 | 0.135 |
| | Resin solid content (wt %) | 10.2 | 10.2 | 10.2 | 10.2 |
| Drying | Dry temperature (° C.) | 150 | 150 | 150 | 150 |
| | Dry time (second) | 30 | 30 | 30 | 30 |
| Thickness (μm) | | 0.9 | 0.9 | 0.9 | 0.9 |
| | Coating properties | | | | |
| Fluorine content of coating (wt %) | | 1.04 | 1.04 | 1.22 | 1.22 |
| Silicone content of coating (wt %) | | 2.33 | 2.33 | 2.33 | 2.33 |
| Surface properties | Contact angle (distilled water) | 104.9 | 103.3 | 103.6 | 102.8 |
| | Contact angle (methylene iodine) | 69.9 | 69.1 | 70.7 | 69.0 |
| | Surface free energy (mN/m) | 22.94 | 23.38 | 22.49 | 23.44 |
| | Peel force | | | | |
| Acrylic adhesive tape | After 24 hours (N/cm) | 0.02 | 0.06 | 0.16 | 0.17 |
| | 130° C. × 1 hour (N/cm) | 0.17 | 0.18 | 1.04 | 2.08 |
| Silicone-based adhesive tape | After 24 hours (N/cm) | 0.09 | 0.56 | 1.09 | 1.68 |
| | 130° C. × 1 hour (N/cm) | 0.32 | 1.69 | 1.96 | 2.79 |
| Residual adhesive (%) | | 98.7 | 98.3 | 99.3 | 98.0 |
| | Coating strength | | | | |
| Rub-off test | | No change | No change | No change | No change |
| Solvent resistance test (coating fall-out) | | Absent | Absent | Absent | Present |

(Discussion on the Evaluations of Test Examples and the Like)

A comparison between Test Example 13 and Comparative Test Example 8 revealed that the coating including a fluorosilsesquioxane compound of Test Examples 13 has more excellent releasability, in particular, expresses significantly excellent releasability against an acrylic adhesive tape after heating, and against a silicone-based adhesive tape at room temperature and after heating, though the coating including a fluorosilsesquioxane compound of Test Examples 13 has the fluoroalkylmethacrylate. Further, fluorosilsesquioxane is found to be effective to strengthen the releasability of organopolysiloxane even when the kind of epoxy resin that is a matrix resin varies.

Results of the solvent resistance test of each of Test Example 14 and Comparative Test Example 9 revealed that the coating of Test Example 14 has obviously excellent solvent resistance. This property is also attributed to effects of the fluorosilsesquioxane compound included in the coating film.

As shown in the Table 6, the coating films used in Examples 13 and 14 each have non-wetting properties, antifouling-properties, nonstick, releasability, and chemical resistance as compared to the coating films each of which do not include the fluorosilsesquioxane compound (Comparative Test Examples 8 and 9). Those properties are attributed to effects of the fluorosilsesquioxane compound included in the coating film.

The coating film of the present application which is obtained by using a surface treating agent, the surface treating agent containing a resin composition including: a copolymer of silsesquioxane and organopolysiloxane; and an organic resin, has strengthened chemical resistance and also is excellent as a permanent film.

Comparative Example 4

Synthesis of Polymer (B4)

(Polymerization)

To a 50-mL four-necked flask attached with a reflux condenser, a thermometer, a dropping funnel, and a septum cap provided with a syringe for argon bubbling, 0.52 g of GMA, 0.47 g of OXE-30, 0.22 g of M100, 4.27 g of FM0721, 6.52 g of MMA, and 17.92 g of MEK were introduced, and the flask was sealed with nitrogen. The flask was set in an oil bath at 95° C. to reflux the mixture therein and perform deoxidation for 10 minutes. Next, a solution obtained by dissolving each of 0.05 g of AIBN and 0.03 g of AcSH in 0.70 g of MEK was introduced into the flask to start polymerization while the reflux temperature was maintained. After 3-hour polymerization, a solution obtained by dissolving 0.05 g of AIBN in 0.45 g of MEK was introduced into the flask to continue the polymerization for additional 2 hours. After the polymerization, the resultant polymerization composition was added with 15 mL of Solmix AP-1, and the whole was poured into 300 mL of SOLMIX AP-1 to deposit the polymer. The supernatant was removed from the SOLMIX AP-1 mixture and the remainder was dried under reduced pressure (80° C., 3 hours), to thereby obtain 6.69 g of a polymer (B4). The weight average molecular weight and the molecular weight distribution of the obtained polymer, which were determined by a GPC analysis, were 36,300 and 1.79, respectively. Further, the composition (molar ratio) of monomer component of the polymer (B4), which was determined by an $H^1$-NMR measurement, was expressed as the following: GMA:OXE-30: M100:FM0721:MMA=4.5:3.8:1.4:1.1:89.2.

Example 10

Preparation of Coating Solution (C-1)

Each of 0.24 g of the obtained polymer (A9) and 3.76 g of EHPE3150CE (a mixture of condensation product of 1,2-epoxy-4(2-oxiranyl)-cyclohexane of 2,2-bis(hydroxymethyl)-1-butanol and (3',4'-epoxycyclohexane)methyl-3,4-epoxycyclohexanecarboxylate, epoxy equivalent: 151 g/mol, manufactured by DICEL CHEMICAL INDUSTRIES, LTD.) was dissolved into 36.0 g of a mixed solvent (2-butanone/cyclohexanone/2-propanol/methyl 3-methoxypropionate=50/20/15/15 in weight ratio). Further, 0.03 g of a cationic polymerization initiator (epoxy group/cationic polymerization initiator=398/1 (in molar ratio), epoxy amount: 25.0 mmol) as a curing agent was added to the mixture, to thereby obtain a coating solution (C-1).

The fluorine concentration of a resin solid content of the coating solution (C-1) was 1.04 weight %, and the silicone concentration of the resin solid content was 2.33 weight %. The terms "fluorine concentration of a resin solid content" and "silicone concentration of the resin solid content" mean the ratio of each of fluorine and silicone weights included in the polymer (A9) with respect to the total weight of the polymer (A9) and EHPE3150CE, respectively, and were each calculated from the weight ratio between the polymer (A9) and EHPE3150CE (Table 7).

Comparative Example 5

Preparation of Coating Solution (D-1)

Each of 0.24 g of the obtained polymer (B3) and 3.76 g of EHPE3150CE (a mixture of condensation product of 1,2-epoxy-4(2-oxiranyl)-cyclohexane of 2,2-bis(hydroxymethyl)-1-butanol and (3',4'-epoxycyclohexane)methyl-3,4-epoxycyclohexanecarboxylate, epoxy equivalent: 151 g/mol, manufactured by DICEL CHEMICAL INDUSTRIES, LTD.) was dissolved into 36.0 g of a mixed solvent (2-butanone/cyclohexanone/2-propanol/methyl 3-methoxypropionate=50/20/15/15 in weight ratio). Further, 0.03 g of a cationic polymerization initiator (epoxy group/cationic polymerization initiator=398/1 (in molar ratio), epoxy amount: 25.3 mmol) as a curing agent was added to the mixture, to thereby obtain a coating solution (D-1).

The fluorine concentration of a resin solid content of the obtained coating solution (D-1) was 1.22 weight %, and the silicone concentration of the resin solid content was 2.33 weight %. The terms "fluorine concentration of a resin solid content" and "silicone concentration of the resin solid content" mean the ratio of each of fluorine and silicone weights included in the polymer (B3) with respect to the total weight of the polymer (B3) and EHPE3150CE, respectively, and were each calculated from the weight ratio between the polymer (B3) and EHPE3150CE (Table 7).

Comparative Example 6

Preparation of Coating Solution (D-2)

Each of 0.24 g of the obtained polymer (B4) and 3.76 g of EHPE3150CE (a mixture of condensation product of 1,2-epoxy-4(2-oxiranyl)-cyclohexane of 2,2-bis(hydroxymethyl)-1-butanol and (3',4'-epoxycyclohexane)methyl-3,4-epoxycyclohexanecarboxylate, epoxy equivalent: 151 g/mol, manufactured by DICEL CHEMICAL INDUSTRIES, LTD.) was dissolved into 36.0 g of a mixed solvent (2-butanone/cyclohexanone/2-propanol/methyl 3-methoxypropionate=50/20/15/15 in weight ratio). Further, 0.03 g of a cationic polymerization initiator (epoxy group/cationic polymerization initiator=398/1 (in molar ratio), epoxy amount: 25.3 mmol) as a curing agent was added to the mixture, to thereby obtain a coating solution (D-2).

The fluorine concentration of a resin solid content of the obtained coating solution (D-2) was 0 weight %, and the silicone concentration of the resin solid content was 2.33 weight %. The terms "fluorine concentration of a resin solid content" and "silicone concentration of the resin solid content" mean the ratio of each of fluorine and silicone weights included in the polymer (B4) with respect to the total weight of the polymer (B4) and EHPE3150CE, respectively, and were each calculated from the weight ratio between the polymer (B4) and EHPE3150CE (Table 7).

TABLE 7

|  |  | Example 10 C-1 | Comparative Example 5 D-1 | Comparative Example 6 D-2 |
|---|---|---|---|---|
|  | Constitution of coating solution |  |  |  |
| Formulation of coating solution | Copolymer (A9) | 0.24 | — | — |
|  | Copolymer (B3) | — | 0.24 | — |
|  | Copolymer (B4) | — | — | 0.24 |
|  | EHPE3150CE | 3.76 | 3.76 | 3.76 |
|  | Mixed solvent weight | 36.0 | 36.0 | 36.0 |
|  | Mixed solvent composition (wt %) |  |  |  |
|  | 2-Butanone | 50 | 50 | 50 |
|  | Cycylohexanone | 20 | 20 | 20 |
|  | 2-Propanol | 15 | 15 | 15 |
|  | Methyl 3-methoxypropionate | 15 | 15 | 15 |
|  | Cationic polymerization initiator | 0.03 | 0.03 | 0.03 |
|  | Resin solid content (Wt %) | 10.2 | 10.2 | 10.2 |
| Fluorine content of resin solid content (Wt %) |  | 1.04 | 1.22 | 0 |
| Silicone content of resin solid content (Wt %) |  | 2.33 | 2.33 | 2.38 |

Example 11

The coating solution (C-1) was applied onto a polyethylene terephthalate film (thickness: 75 μm, brand name: Lumirror 75-T60, manufactured by Toray Industries, Inc.) by using a coating rod (#4, manufactured by R.D. Specialties). A wet thickness at the use of the coating rod (#4) was 9 μm. The obtained coating was cured/dried in a high-temperature chamber at 150° C. for 30 seconds, to thereby obtain a clear coating film having a thickness of about 0.9 μm. The thickness was calculated from the wet thickness at the use of the coating rod (#4) and a resin solid content in the coating solution in accordance with the following formula.

Thickness (μm)=(wet thickness at use of coating rod)× (resin solid content in weight % in coating solution)/100

Comparative Example 7

A clear coating film having a theoretical thickness of about 0.9 μm was obtained by the same procedures as those of Example 11 except that the coating solution (D-1) was used instead of the coating solution (C-1).

Example 12

The coating solution (C-1) was applied onto a stainless plate (SUS 304, 130 mm length, 70 mm width, and 0.5 mm thickness) by using a coating rod (#4, manufactured by R.D. Specialties). A wet thickness at the use of the coating rod (#4) was 9 μm. The obtained coating was cured/dried in a high-temperature chamber at 150° C. for 30 seconds, to thereby obtain a clear coating film having a thickness of about 0.9 μm. The thickness was calculated from the wet thickness at the use of the coating rod (#4) and a resin solid content in the coating solution in accordance with the following formula.

Thickness (μm)=(wet thickness at use of coating rod)× (resin solid content in weight % in coating solution)/100

Comparative Example 8

A clear coating film having a theoretical thickness of about 0.9 μm was obtained by the same procedures as those of Example 12 except that the coating solution (D-1) was used instead of the coating solution (C-1).

Comparative Example 9

A clear coating film having a theoretical thickness of about 0.9 μm was obtained by the same procedures as those of Example 12 except that the coating solution (D-2) was used instead of the coating solution (C-1).

Example 13

The coating solution (C-1) was applied onto a glass substrate (Corning Glass #1737, 130 mm length, 70 mm width, and 0.7 mm thickness) by using a coating rod (#4, manufactured by R.D. Specialties). A wet thickness at the use of the coating rod (#4) was 9 μm. The obtained coating was cured/dried in a high-temperature chamber at 150° C. for 30 seconds, to thereby obtain a clear coating film having a thickness of about 0.9 μm. The thickness was calculated from the wet thickness at the use of the coating rod (#4) and a resin solid content in the coating solution in accordance with the following formula.

Thickness (μm)=(wet thickness at use of coating rod)× (resin solid content in weight % in coating solution)/100

Comparative Example 10

A clear coating film having a theoretical thickness of about 0.9 μm was obtained by the same procedures as those of Example 13 except that the coating solution (D-1) was used instead of the coating solution (C-1).

Comparative Example 11

A clear coating film having a theoretical thickness of about 0.9 μm was obtained by the same procedures as those of Example 13 except that the coating solution (D-2) was used instead of the coating solution (C-1).

Test Example 16

The physical property values of each of the coating films obtained in Example 11, Comparative Example 7, Example 12, Comparative Example 8, Example 13, and Comparative Example 10 were measured by the following methods.

1) Peel Force Test

A piece of an acrylic adhesive tape (NITTO DENKO CORPORATION No. 31B) and a piece of a silicone-based adhesive tape (TERAOKA CORPORATION No. 640S) were stuck on the surface of a peel off layer of the film, and the whole was subjected to contact bonding with a 2-kg weight pressure roller. Peel force between the peel off layer and the adhesive layer 24 hours after the contact bonding was measured with a tensile testing machine.

2) Peel Force Test (Heat Resistance)

A piece of an acrylic adhesive tape (NITTO DENKO CORPORATION No. 31B) and a piece of a silicone-based adhesive tape (TERAOKA CORPORATION No. 640S) were stuck on the surface of a peel off layer of the film, and the whole was subjected to contact bonding with a 2-kg weight pressure roller and then left stood at room temperature for 30 minutes. Next, the pressed product was subjected to thermal history in a high-temperature chamber at 130° C. for 1 hour and then stood to be cooled for 30 minutes. After that, peel force between the peel off layer and the adhesive layer was measured with a tensile testing machine.

3) Residual Adhesive Measurement

A piece of an acrylic adhesive tape (NITTO DENKO CORPORATION No. 31B, tape width: 25 mm) was stuck on a plate made of Teflon (trade name, 100 mm length, 100 mm width, and 2 mm thickness), and the whole was subjected to contact bonding by being pressurized back and forth once with a 2-kg weight pressure roller. After that, an SUS plate (material: SUS 304, 100 mm length, 100 mm width, and 1 mm thickness) was placed on the tape which had been subjected to contact bonding, and a 2-kg weight was further placed thereon to give the tape a load of 20 g per 1 cm². Next, the pressed product was subjected to thermal history in a high-temperature chamber at 70° C. for 20 hours, stood to be cooled for 30 minutes, and given the load. After that, the piece of an acrylic adhesive tape (NITTO DENKO CORPORATION No. 31B) which had been subjected to thermal history was stuck on the SUS plate (SUS 304) again, and the whole was subjected to contact bonding by being pressurized back and forth once with a 2-kg weight pressure roller. Peel force 30 minutes after the contact bonding was referred to as "basic adhesion ($f_0$)". The piece of an acrylic adhesive tape was stuck on the surface of the peel off layer of the film, and the whole was subjected to contact bonding by being pressurized back and forth once with a 2-kg weight pressure roller. After that, an SUS plate (material: SUS 304, 100 mm length, 100 mm width, and 1 mm thickness) was placed on the tape which had been subjected to contact bonding, and a 2-kg weight was further placed thereon to give the tape a load of 20 g per 1 cm². Next, the pressed product was subjected to thermal history in a high-temperature chamber at 70° C. for 20 hours, stood to be cooled for 30 minutes, and given the load. After that, the piece of an acrylic adhesive tape (NITTO DENKO CORPORATION No. 31B, tape width: 25 mm) which had been subjected to thermal history was stuck on the SUS plate (SUS 304) again, and the whole was subjected to contact bonding by being pressurized back and forth once with a 2-kg weight pressure roller. Peel force 30 minutes after the contact bonding was referred to as "residual adhesive (f)". The residual adhesive was determined from the obtained basic adhesion and residual adhesive by using the following formula.

$$\text{Residual adherence rate (\%)} = (f/f_0) \times 100$$

4) Contact Angle and Surface Free Energy Measurements

A contact angle of each of the coating films was measured by using, as a probe liquid, distilled water (for nitrogen and phosphorous measurement, available from KANTO CHEMICAL. CO. INC.) and methylene iodine (99%, available from SIGMA-ALDRICH Japan K.K.), to thereby calculate surface free energy in accordance with the theory of Kaelble-Uy.

5) Rub-Off Test

The each of the coating films was rubbed by finger-tip 10 times to evaluate the presence or absence of fall-out of the coating.

6) Solvent Resistance

A cotton wool impregnated with acetone was reciprocated on the each of the coating films 10 times to evaluate the presence or absence of fall-out of the coating.

Tables 8 to 10 show the physical property values of each of the coating films obtained in Example 11, Comparative Example 7, Example 12, Comparative Example 8, Example 13, and Comparative Example 10, and the test results obtained by using those coating films, respectively.

TABLE 8

|  |  | | Example 11 | Comparative Example 7 |
|---|---|---|---|---|
| Coating solution | | | C-1 | D-1 |
| Substrate | | | Polyethylene terephthalate film (thickness: 75 μm) | |
| Thickness (μm) | | | 0.9 | 0.9 |
| Fluorine content in coating (wt %) | | | 1.04 | 1.22 |
| Silicone content in coating (wt %) | | | 2.33 | 2.33 |
| Surface properties | | Contact angle (distilled water) (°) | 105.0 | 103.8 |
| | | Contact angle (methylene iodine) (°) | 69.1 | 70.2 |
| | | Surface free energy (mN/m) | 23.39 | 22.76 |
| Release properties | Acrylic adhesive tape | After 24 hours (N/cm) | 0.02 | 0.13 |
| | | 130° C. × 1 hour (N/cm) | 0.20 | 1.73 |
| | Silicone-based adhesive tape | After 24 hours (N/cm) | 0.05 | 0.04 |
| | | 130° C. × 1 hour (N/cm) | 0.32 | 1.40 |
| | Residual adherence rate (%) | | 98.6 | 97.5 |
| Coating strength | Rub-off test | | No change | No change |
| | Solvent resistance test (vs acetone) | | Absent | Absent |

TABLE 9

|  |  | Example 12 | Comparative Example 8 |
|---|---|---|---|
| Coating solution | | C-1 | D-1 |
| Substrate | | Stainless plate (thickness: 0.5 mm) | |
| Thickness (μm) | | 0.9 | 0.9 |
| Fluorine content in coating (wt %) | | 1.04 | 1.22 |
| Silicone content in coating (wt %) | | 2.33 | 2.33 |
| Surface properties | Contact angle (distilled water) (°) | 105.0 | 104.5 |
| | Contact angle (methylene iodine) (°) | 70.1 | 71.2 |
| | Surface free energy (mN/m) | 22.82 | 22.21 |
| Release properties | Acrylic adhesive tape After 24 hours (N/cm) | 0.03 | 0.13 |
| | 130° C. × 1 hour (N/cm) | 0.04 | 1.73 |
| | Silicone-based adhesive tape After 24 hours (N/cm) | 0.05 | 0.04 |
| | 130° C. × 1 hour (N/cm) | 0.08 | 1.40 |
| | Residual adherence rate (%) | 99.9 | 98.1 |
| Coating strength | Rub-off test | No change | No change |
| | Solvent resistance test (vs acetone) | Absent | Absent |

TABLE 10

|  |  | Example 13 | Comparative Example 10 |
|---|---|---|---|
| Coating solution | | C-1 | D-1 |
| Substrate | | Glass plate (thickness: 0.7 mm) | |
| Thickness (μm) | | 0.9 | 0.9 |
| Fluorine content in coating (wt %) | | 1.04 | 1.22 |
| Silicone content in coating (wt %) | | 2.33 | 2.33 |
| Surface properties | Contact angle (distilled water) (°) | 105.0 | 104.2 |
| | Contact angle (methylene iodine) (°) | 70.1 | 71.1 |
| | Surface free energy (mN/m) | 22.82 | 22.26 |
| Release properties | Acrylic adhesive tape After 24 hours (N/cm) | 0.02 | 0.04 |
| | 130° C. × 1 hour (N/cm) | 0.03 | 0.16 |
| | Silicone-based adhesive tape After 24 hours (N/cm) | 0.05 | 0.08 |
| | 130° C. × 1 hour (N/cm) | 0.11 | 0.63 |
| | Residual adherence rate (%) | 98.9 | 98.0 |
| Coating strength | Rub-off test | No change | No change |
| | Solvent resistance test (vs acetone) | Absent | Absent |

(Discussion on the Evaluations of Test Examples and the Like)

A comparison between Example 11 and Comparative Example 7 in the Table 8 revealed that the coating including a fluorosilsesquioxane compound of Examples 11 has more excellent releasability, in particular, expresses significantly excellent releasability against an acrylic adhesive tape after heating, and against a silicone-based adhesive tape at room temperature and after heating, though the coating including a fluorosilsesquioxane compound of Examples 11 has the silicone content similar to that of Comparative Example 7 and a low fluorine concentration.

Comparisons between Examples 12 and 13 and Comparative Examples 8 and 10 in the Tables 9 and 10 revealed that the coatings including a fluorosilsesquioxane compound of Examples 12 and 13 each have more excellent releasability, though they each have the silicone content similar to those of Comparative Examples 8 and 10 and a low fluorine concentration.

The Tables 8 to 10 show that the coatings including a fluorosilsesquioxane compound of Examples 11 to 13 each express excellent releasability irrespective of the kind of the substrate (polyethylene terephthalate film, stainless plate, and glass plate).

As shown in the Tables 8 to 10, the coating films used in Examples 11 to 13 each have non-wetting properties, non-stick, releasability, and chemical resistance as compared to the coating films each of which does not include the fluorosilsesquioxane compound (Comparative Examples 7, 8 and 10). Those properties are attributed to effects of the fluorosilsesquioxane compound included in the coating film.

The coating film of the present application which is obtained by using a surface treating agent, the surface treating agent containing a resin composition including: a copolymer of silsesquioxane and organopolysiloxane; and an organic resin, has strengthened chemical resistance and also is excellent as a permanent film.

Test Example 17

The physical property values of each of the coating films obtained in Example 12, Comparative Example 9, Example 13, and Comparative Example 11 of the invention were measured by the following methods.

(Degree of Surface Hardness)

Measurements were performed in accordance with JIS K5400 by using a surface property tester HEIDON Type: 14W (manufactured by SHINTO Scientific Co., Ltd.).

(Adhesiveness)

11 cut lines were made at an interval of 1 mm in each of longitudinal and transversal directions on a coating to prepare 100 squares. A piece of commercially available cellophane tape (Cellotape (trade name), CT24, manufactured by NICHIBAN CO., LTD.) was securely attached to the resultant coating. After that, the piece of cellophane tape was suddenly peeled off the coating in a front direction at 90°, and the number of the squares in which the coating remained without being peeled was obtained. Note that the method was performed in accordance with JIS K5400.

(Sliding Properties)

Measurements were performed in accordance with ASTM D 1894-3 by using a surface property tester HEIDON Type: 14W (manufactured by SHINTO Scientific Co., Ltd.).

(Antifouling-Properties)

Lines each having 1.5 mm width and 100 mm length were drawn on the coating by using an oil-base marking pen (Magic ink (trade name), black, M500-T1, manufactured by Teranishi Chemical Industry Co., Ltd.) and an oil-base marking pen (Magic ink (trade name), red, M500-T2, manufactured by Teranishi Chemical Industry Co., Ltd.) The coating was left at room temperature for 24 hours and then the lines were wiped off the coating with a sheet wiper (Kimwipes S-200 (trade name), manufactured by Jujo Kimberly Inc.). Evaluations on easiness to wipe off and conditions of the coating after the lines were wiped were made in accordance with the following evaluation criteria.

+++: A line can easily be wiped off a coating.

++: A line is hard to be wiped off a coating but does not remain on the coating.

+: A line is hard to be wiped off a coating and remains on the coating.

Tables 11 and 12 show each of the physical property values and evaluations of the obtained coating films.

TABLE 11

| | | Example 12 | Comparative Example 9 |
|---|---|---|---|
| Coating solution | | C-1 | D-2 |
| Substrate | | Stainless plate (thickness: 0.5 mm) | |
| Fluorine content of coating (wt %) | | 1.04 | 0 |
| Silicone content of coating (wt %) | | 2.33 | 2.38 |
| Degree of surface hardness | Pencil hardness JIS K5400 | 3 H | 3 H |
| Adhesiveness | Square test JIS K5400 | 100/100 | 100/100 |
| Sliding properties | Coefficient of static friction $\mu_s$ (ASTM D 1894-3) | 0.15 | 0.23 |
| | Coefficient of dynamic friction $\mu_k$ (ASTM D 1894-3) | 0.06 | 0.14 |
| Contamination resistance | Easiness to wipe off Magic ink | +++ | + |

TABLE 12

| | | Example 13 | Comparative Example 11 |
|---|---|---|---|
| Coating solution | | C-1 | D-2 |
| Substrate | | Glass plate (thickness: 0.7 mm) | |
| Fluorine content of coating (wt %) | | 1.04 | 0 |
| Silicone content of coating (wt %) | | 2.33 | 2.38 |
| Degree of surface hardness | Pencil hardness JIS K5400 | 3 H | 3 H |
| Adhesiveness | Square test JIS K5400 | 100/100 | 100/100 |
| Sliding properties | Coefficient of static friction $\mu_s$ (ASTM D 1894-3) | 0.14 | 0.22 |
| | Coefficient of dynamic friction $\mu_k$ (ASTM D 1894-3) | 0.06 | 0.12 |
| Contamination resistance | Easiness to wipe off Magic ink | +++ | + |

(Discussion on the Evaluations of Test Examples and the Like)

Comparisons between Examples 12 and 13 and Comparative Examples 9 and 11 in the Tables 11 and 12 revealed that the coatings of Examples 12 and 13 each have better result in easiness to wipe off the magic ink, though they each have the silicone content similar to those of Comparative Examples 9 and 11. Comparisons between Examples 12 and 13 and Comparative Examples 9 and 11 revealed that the coatings of Examples 12 and 13 each have reduced friction resistance, though they each have the silicone content similar to those of Comparative Examples 9 and 11. Those properties are attributed to effects of the fluorosilsesquioxane compound included in the coating film.

In view of the foregoing, it is found that the coating film of the invention which is obtained by using a surface treating agent, the surface treating agent containing a resin composition including: a copolymer of silsesquioxane and organopolysiloxane; and an organic resin, has good adhesiveness to the substrate and can provide antifouling-properties and sliding properties to the surface of the substrate.

Example 14

Preparation of Coating Film

The coating solution (C-1) was applied onto a glass substrate (Synthesized quartz glass, 26 mm length, 28 mm width, and 0.7 mm thickness, manufactured by Vidrex Company Limited.) by using a spin coater (Spinner 1H-III type, manufactured by KYOEI SEMICONDUCTOR INC.) under conditions where rotations is 2,000 rpm and a rotation time is 30 seconds. The coated substrate was cured/dried in a high-temperature chamber at 150° C. for 30 minutes, to thereby obtain a clear coating film. The coating film was cut out of the substrate by using a cutter knife and subjected to a thickness measurement by means of a surface profiler (alpha-step200, manufactured by TENCOR INSTRUMENTS). The thickness of the coating was 0.51 μm.

Comparative Example 12

Preparation of Coating Film

A coating film was obtained by the same procedures as those of Example 14 except that the coating solution (D-1) was used instead of the coating solution (C-1). The thickness of the coating was 0.51 μm.

Test Example 18

The physical property values of each of the coating films obtained in Example 11, Comparative Example 7, Example 14, and Comparative Example 12 of the invention were measured by the following methods.

(Haze)

Haze was measured in accordance with JIS K7105 by using a haze meter (NDH2000, manufactured by Nippon Denshoku Industries Co., Ltd.).

(Transparency Measurement)

Transparency was measured in a wavelength range of 400 to 700 nm by using a ultraviolet and visible spectrophotometer (V-560, JASCO Corporation).

(Refraction Index Measurement)

A refraction index of the coating film was measured in a measurement wavelength of 633 nm by using a fast spectrum ellipsometer M-200U (manufactured by J. A. Woollam Co., Inc.).

(Reflectance Measurement)

Reflectance of the coating film was measured in a measurement wavelength of 550 nm by using a spectrocolorimeter (SPECTRO PHOTOMETER SD5000, manufactured by Nippon Denshoku Industries Co., Ltd.).

Tables 13 and 14 show the physical property values of each of the obtained coating films.

TABLE 13

| Coating solution | Substrate: PET film | Example 11 C-1 | Comparative Example 7 D-1 |
|---|---|---|---|
| Thickness (μm) | — | 0.45 | 0.46 |
| Fluorine content of coating (wt %) | — | 1.04 | 1.22 |
| Silicone content of coating (wt %) | — | 2.33 | 2.33 |
| Haze (%) | 1.15 | 1.14 | 1.18 |
| Transparency (%) | 86.0 | 88.3 | 86.8 |
| Refraction index | 1.79 | 1.51 | 1.52 |
| Reflectance (%) | 20.8 | 17.8 | 18.5 |

TABLE 14

| Coating solution | Substrate: glass plate | Example 14 C-1 | Comparative Example 12 D-1 |
|---|---|---|---|
| Thickness (μm) | — | 0.51 | 0.51 |
| Fluorine content of coating (wt %) | — | 1.04 | 1.22 |
| Silicone content of coating (wt %) | — | 2.33 | 2.33 |
| Haze (%) | 0 | 0 | 0 |
| Transparency (%) | 93.2 | 91.7 | 91.2 |
| Reflectance (%) | 15.0 | 15.1 | 15.5 |

(Discussion on the Evaluations of Test Examples and the Like)

A comparison between the coating films of Example 11 and Comparative Example 7 and a polyethylene terephthalate film as the substrate in the Table 13 revealed that the coating including a fluorosilsesquioxane compound of Example 11 has a reduced haze value and increased transparency, in particular, several % increased transparency in a wavelength region from 400 to 700 nm.

Regarding Example 11 in the Table 13, it is found that the coating of Example 11 has smaller refraction index, though it has a small fluorine content. The property is attributed to effects of the fluorosilsesquioxane compound included in the coating film.

Consequently, it is found that effects of increasing transparency and reducing refraction index effects are obtained when the fluorosilsesquioxane compound is used compared to the case of using the conventional fluoroalkylmethacrylate.

A comparison between Example 14 and Comparative Example 12 in the Table 14 revealed that the coating including the fluorosilsesquioxane compound of Example 14 has higher transparency.

Consequently, good non-wetting properties, antifouling-properties, sliding properties, and nonstick are provided to the substrate without impairing high transparency of the substrate when the fluorosilsesquioxane compound is used instead of the conventional fluoroalkylmethacrylate.

Example 15

Preparation of Coating Film

A sample for measurement of surface resistivity was obtained by applying the coating solution (C-1) onto a silicone wafer (4-inch one side mirror wafer: volume resistivity 9.6 to 11.3 Ω·cm, manufactured by Mitsubishi Materials Corporation) by using a spin coater (Spinner 1H-III type, manufactured by KYOEI SEMICONDUCTOR INC.) under conditions where rotations is 1,500 rpm and a rotation time is 30 seconds. The coated substrate was cured/dried in a high-temperature chamber at 150° C. for 30 minutes, to thereby obtain a clear coating film. The coating film was cut out of the substrate by using a cutter knife and subjected to a thickness measurement by means of a surface profiler (alpha-step200, manufactured by TENCOR INSTRUMENTS). The thickness of the coating was 0.49 μm.

A sample for measurements of volume resistivity and a relative permittivity was obtained by applying the coating solution (C-1) onto a silicone wafer (4-inch one side mirror wafer: volume resistivity ≦0.02 Ω·cm, manufactured by Mitsubishi Materials Corporation) by using a spin coater (Spinner 1H-III type, manufactured by KYOEI SEMICONDUCTOR INC.) under conditions where rotations is 1,500 rpm and a rotation time is 30 seconds. The coated substrate was cured/dried in a high-temperature chamber at 150° C. for 30 minutes, to thereby obtain a clear coating film. The coating film was cut out of the substrate by using a cutter knife and subjected to a thickness measurement by means of a surface profiler (alpha-step200, manufactured by TENCOR INSTRUMENTS). The thickness of the coating was 0.49 μm.

Comparative Example 13

Preparation of Coating Film

A coating film was obtained by the same procedures as those of Example 14 except that the coating solution (D-1) was used instead of the coating solution (C-1). The thickness of the sample for measurement of surface resistivity was 0.48 μm, and the sample for measurements of volume resistivity and a relative permittivity was 0.47 μm.

Test Example 19

The physical property values of each of the coating films obtained in Example 15 and Comparative Example 13 of the invention were measured by the following methods.

(Surface Resistivity Test)

Surface resistivity was measured in accordance with a Mitsubishi Chemical Corporation MCC-A method by using Hiresta-UP MCP-HT 450 (manufactured by Mitsubishi Chemical Corporation).

(Volume Resistivity Test)

Volume resistivity was measured in accordance with a Mitsubishi Chemical Corporation MCC-A method by using Hiresta-UP MCP-HT 450 (manufactured by Mitsubishi Chemical Corporation).

(Relative Permittivity Test)

A relative permittivity was measured at frequencies of 1 kHz and 100 kHz by using an LCR meter HP4263B (manufactured by Agilent Technologies). A relative permittivity was measured at frequency of 1 MHz by using a precision LCR meter HP4284A (manufactured by Agilent Technologies).

Table 15 shows the physical property values of each of the obtained coatings.

TABLE 15

| Coating solution | | Example 15 C-1 | Comparative Example 13 D-1 |
|---|---|---|---|
| Electrical properties | Surface resistivity (Ω/□) | >1.0 × 10$^{15}$ | >1.0 × 10$^{15}$ |
| | Volume resistivity (Ω/cm) | >1.0 × 10$^{15}$ | >1.0 × 10$^{15}$ |
| | Relative permittivity 1 kHz | 4.3 | 4.3 |
| | 100 kHz | 2.6 | 2.7 |
| | 1 MHz | 2.3 | — |

This application claims the priority based on the patent applications of Japanese Patent Application No. 2005-282232 filed on Sep. 28, 2005, Japanese Patent Application No. 2006-42561 filed on Feb. 20, 2006, Japanese Patent Application No. 2006-201319 filed on Jul. 24, 2006, and Japanese Patent Application No. 2006-264776 filed on Sep. 28, 2006. Those patent applications are incorporated herein by reference.

The invention claimed is:

1. A surface treating agent, comprising an epoxy resin monomer; and, an addition copolymer of fluorosilsesquioxane (a) having one addition polymerizable functional group and organopolysiloxane (c) having an addition polymerizable functional group, or an addition copolymer of the fluorosilsesquioxane (a) having one addition polymerizable functional group, the organopolysiloxane (c) having an addition polymerizable functional group, and an addition polymerizable monomer (b), wherein the fluorosilsesquioxane (a) is represented by the following formula (I) and the organopolysiloxane (c) is represented by the following formula (IV),

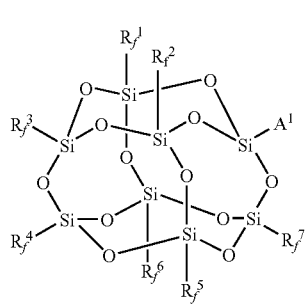

(I)

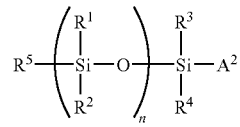

(IV)

(In the formula (I), $R_f^1$ to $R_f^7$ each independently represent linear or branched fluoroalkyl having 1 to 20 carbon atoms and a methylene thereof may be substituted by oxygen;

fluoroaryl having 6 to 20 carbon atoms and at least one hydrogen which is substituted by fluorine or trifluoromethyl; or fluoroarylalkyl having 7 to 20 carbon atoms and at least one hydrogen of the aryl, which is substituted by fluorine or trifluoromethyl, and $A^1$ represents an addition polymerizable functional group,)

(In the formula (IV), n represents an integer of 1 to 1,000; $R^1$, $R^2$, $R^3$, $R^4$, and $R^5$ each represent a group independently selected from the group consisting of: hydrogen; alkyl having 1 to 30 carbon atoms, a hydrogen thereof may be substituted by fluorine, and a —CH$_2$— thereof may be substituted by —O— or cycloalkylene; substituted or unsubstituted aryl; and arylalkyl composed of substituted or unsubstituted aryl and alkylene having a hydrogen thereof may be substituted by fluorine and a —CH$_2$— thereof may be substituted by —O— or cycloalkylene; and $A^2$ represents an addition polymerizable functional group).

2. A coating film, which is obtained by using the surface treating agent according to claim 1.

3. A peel-off coating film, which is obtained by using the surface treating agent according to claim 1.

4. A non-wetting coating film, which is obtained by using the surface treating agent according to claim 1.

5. An antifouling coating film, which is obtained by using the surface treating agent according to claim 1.

6. A sliding coating film, which is obtained by using the surface treating agent according to claim 1.

7. An antireflection coating film, which is obtained by using the surface treating agent according to claim 1.

8. An insulating coating film, which is obtained by using the surface treating agent according to claim 1.

9. The surface treating agent according to claim 1, wherein the concentration of fluorine atom of the surface treating agent is 0.01 to 5% by weight.

10. The surface treating agent according to claim 1, wherein $R_f^1$ to $R_f^7$ in the formula (I) each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

11. The surface treating agent according to claim 10, wherein $R_f^1$ to $R_f^7$ in the formula (I) each independently represent 3,3,3-trifluoropropyl or 3,3,4,4,5,5,6,6,6-nonafluorohexyl.

12. The surface treating agent according to claim 1, wherein:
   in the formula (IV), $R^1$ and $R^2$ each independently represent hydrogen, phenyl, or alkyl having 1 to 8 carbon atoms and a hydrogen thereof may be substituted by fluorine;
   $R^3$ and $R^4$ each independently represent alkyl having 1 to 20 carbon atoms and a hydrogen thereof may be substituted by fluorine, aryl having 6 to 20 carbon atoms and a hydrogen thereof may be substituted by fluorine, or arylalkyl having 7 to 20 carbon atoms and a hydrogen thereof may be substituted by fluorine; and
   $R^5$ represents alkyl having 1 to 20 carbon atoms and a hydrogen thereof may be substituted by fluorine, aryl having 6 to 20 carbon atoms and a hydrogen thereof may be substituted by fluorine, or arylalkyl having 7 to 20 carbon atoms and a hydrogen thereof may be substituted by fluorine.

13. The surface treating agent according to claim 12, wherein:
   in the formula (IV), $R^1$ and $R^2$ each independently represent methyl, phenyl, or 3,3,3-trifluoropropyl;
   $R^3$ and $R^4$ each independently represent methyl or phenyl; and
   $R^5$ represents methyl, ethyl, propyl, butyl, isobutyl, or phenyl.

14. The surface treating agent according to claim 13, wherein $R^1$, $R^2$, $R^3$, and $R^4$ each simultaneously represent methyl.

15. The surface treating agent according to claim 1, wherein $A^1$ in the formula (I) and $A^2$ in the formula (IV) each represent a radical polymerizable functional group.

16. The surface treating agent according to claim 15, wherein $A^1$ in the formula (I) and $A^2$ in the formula (IV) each include (meth)acryl or styryl.

17. The surface treating agent according to claim 16, wherein $A^1$ in the formula (I) is any one of groups represented by the following formulae (V) and (VII), and $A^2$ in the formula (IV) is any one of groups represented by the following formulae (V), (VI), and (VII);

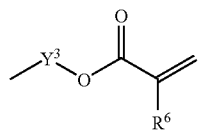 (V)

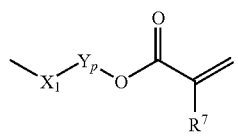 (VI)

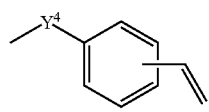 (VII)

(In the formula (V), $Y^3$ represents alkylene having 2 to 10 carbon atoms, and $R^6$ represents hydrogen, linear or branched alkyl having 1 to 5 carbon atoms, or aryl having 6 to 10 carbon atoms; in the formula (VI), $R^7$ represents hydrogen, linear or branched alkyl having 1 to 5 carbon atoms, or aryl having 6 to 10 carbon atoms, $X_1$ represents alkylene having 2 to 20 carbon atoms, Y represents —$OCH_2CH_2$—, —$OCH(CH_3)CH_2$—, or —$OCH_2CH(CH_3)$—, and p represents an integer of 0 to 3; and in the formula (VII) $Y^4$ represents a single bond or alkylene having 1 to 10 carbon atoms.)

18. The surface treating agent according to claim 17, wherein:
   in the formula (V), $Y^3$ represents alkylene having 2 to 6 carbon atoms, and $R^6$ represents hydrogen or alkyl having 1 to 3 carbon atoms;
   in the formula (VI), $X_1$ represents —$CH_2CH_2CH_2$—, Y represents —$OCH_2CH_2$—, p represents an integer of 0 or 1, and $R^7$ represents hydrogen or alkyl having 1 to 3 carbon atoms; and, in the formula (VII), $Y^4$ represents a single bond or alkylene having 1 or 2 carbon atoms.

19. The surface treating agent according to claim 1, wherein the addition polymerizable monomer (b) is at least one kind of an addition polymerizable monomer having a crosslinking functional group and a monomer having no crosslinking functional group.

20. The surface treating agent to claim 1, wherein the addition polymerizable monomer (b) is an addition polymerizable monomer having a crosslinking functional group.

21. The surface treating agent according to claim 20, wherein the addition polymerizable monomer having a crosslinking functional group comprises a compound which has a radical polymerizable functional group and in the same molecule at least one of hydroxy, glycidyl, oxetanyl, epoxycyclohexenyl, halogenated alkyl, blocked isocyanato, isocyanato, amino, and carboxyl.

22. The surface treating agent according to claim 21, wherein the radical polymerizable functional group in the addition polymerizable monomer having a crosslinking functional group is (meth)acryl or styryl.

23. The surface treating agent according to claim 1, further, comprising a thermoplastic resin and/or a thermosetting resin.

24. The surface treating agent according to claim 23, further, comprising a thermosetting resin.

25. The surface treating agent according to claim 24, wherein the thermosetting resin is a compound which has hydroxy, glycidyl, oxetanyl, epoxycyclohexenyl, halogenated alkyl, blocked isocyanato, isocyanato, amino, or carboxyl.

26. The surface treating agent according to claim 25, wherein the thermosetting resin is a compound which has glycidyl, oxetanyl, or epoxycyclohexenyl.

* * * * *